US012592454B2

(12) United States Patent
Omoda

(10) Patent No.: US 12,592,454 B2
(45) Date of Patent: Mar. 31, 2026

(54) ALL-SOLID-STATE RECHARGEABLE BATTERY, STACKED RECHARGEABLE ALL-SOLID-STATE BATTERY, AND MANUFACTURING METHOD THEREOF

(71) Applicant: SAMSUNG SDI CO., LTD., Yongin-si (KR)

(72) Inventor: Ryo Omoda, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 446 days.

(21) Appl. No.: 18/013,424

(22) PCT Filed: Jun. 1, 2021

(86) PCT No.: PCT/KR2021/006793
§ 371 (c)(1),
(2) Date: Dec. 28, 2022

(87) PCT Pub. No.: WO2022/050534
PCT Pub. Date: Mar. 10, 2022

(65) Prior Publication Data
US 2023/0344083 A1      Oct. 26, 2023

(30) Foreign Application Priority Data

Sep. 7, 2020    (JP) ................................. 2020-150093
Feb. 5, 2021    (KR) ........................ 10-2021-0016967

(51) Int. Cl.
*H01M 50/46*          (2021.01)
*H01M 10/0562*       (2010.01)
(Continued)

(52) U.S. Cl.
CPC ....... *H01M 50/46* (2021.01); *H01M 10/0562* (2013.01); *H01M 10/0585* (2013.01); *H01M 50/446* (2021.01); *H01M 2300/0068* (2013.01)

(58) Field of Classification Search
CPC ........... H01M 10/052; H01M 10/0562; H01M 10/0585; H01M 2300/0068; H01M 4/667;
(Continued)

(56) References Cited

U.S. PATENT DOCUMENTS

2004/0086781 A1    5/2004  Fukuzawa et al.
2005/0019663 A1    1/2005  Nanno et al.
(Continued)

FOREIGN PATENT DOCUMENTS

CN          106159179 A        11/2016
JP          07-249403 A        9/1995
(Continued)

OTHER PUBLICATIONS

Machine translation JP2017157271A (Year: 2017).*
(Continued)

*Primary Examiner* — Victoria H Lynch
(74) *Attorney, Agent, or Firm* — Lee IP Law, P.C.

(57) ABSTRACT

The present invention relates to an all-solid-state rechargeable battery in which the protrusions and recesses of the surface of the all-solid-state rechargeable battery are reduced, and a current-collecting portion is difficult to crack or cut. The all-solid-state rechargeable battery includes a first electrode layer that is either a positive electrode layer or a negative electrode layer; solid electrolyte layers stacked on both surfaces of the first electrode layer, respectively; a second electrode layer that is the other of the positive electrode layer or the negative electrode layer stacked on the outer surfaces of the solid electrolyte layers, respectively; an insulating layer disposed on a side end surface of the first electrode layer; and a thin current-collecting portion protruding from the first electrode layer through the insulating layer to the outside, wherein a side end surface of the insulating layer on the side from which the current-collect-
(Continued)

stacking direction protruding direction ing portion protrudes has a roughened portion having a surface roughness that differs from that of another side end surface of the insulating layer.

20 Claims, 16 Drawing Sheets

(51) Int. Cl.
H01M 10/0585 (2010.01)
H01M 50/446 (2021.01)

(58) Field of Classification Search
CPC .. H01M 50/446; H01M 50/46; H01M 50/586; H01M 50/59; Y02E 60/10; Y02P 70/50
See application file for complete search history.

(56) References Cited

U.S. PATENT DOCUMENTS

| | | | |
|---|---|---|---|
| 2012/0115018 A1 | 5/2012 | Kawaoka et al. | |
| 2014/0079992 A1 | 3/2014 | Tanaka | |
| 2017/0125826 A1 | 5/2017 | Noponen et al. | |
| 2017/0373300 A1 | 12/2017 | Maeda et al. | |
| 2018/0076474 A1 | 3/2018 | Glanz et al. | |
| 2019/0131603 A1 | 5/2019 | Park et al. | |
| 2019/0214677 A1 | 7/2019 | Yamada et al. | |
| 2019/0334205 A1 | 10/2019 | Waseda | |
| 2020/0266494 A1 | 8/2020 | Takeuchi et al. | |
| 2021/0273235 A1* | 9/2021 | Taniuchi ............. | H01M 4/5815 |
| 2021/0305630 A1 | 9/2021 | Ohta et al. | |
| 2021/0313625 A1 | 10/2021 | Kato et al. | |
| 2022/0085419 A1 | 3/2022 | Itoh et al. | |

FOREIGN PATENT DOCUMENTS

| | | | | | |
|---|---|---|---|---|---|
| JP | 09-035724 | A | 2/1997 | | |
| JP | 2004-152596 | A | 5/2004 | | |
| JP | 2007-257859 | A | 10/2007 | | |
| JP | 2007-273436 | A | 10/2007 | | |
| JP | 4617105 | B2 | 1/2011 | | |
| JP | 5131283 | B2 | 11/2012 | | |
| JP | 2015-125893 | A | 7/2015 | | |
| JP | 2015-162353 | A | 9/2015 | | |
| JP | 2017-117672 | A | 6/2017 | | |
| JP | 2017-523567 | A | 8/2017 | | |
| JP | 2017157271 | A | * | 9/2017 | ........ H01M 10/0562 |
| JP | 2019-096476 | A | 6/2019 | | |
| JP | 2019-121558 | A | 7/2019 | | |
| JP | 2019-192610 | A | 10/2019 | | |
| JP | 2019-200863 | A | 11/2019 | | |
| JP | 2020-004697 | A | 1/2020 | | |
| KR | 10-2014-0009497 | A | 1/2014 | | |
| KR | 10-2019-0048312 | A | 5/2019 | | |
| WO | WO 2016-152565 | A1 | 9/2016 | | |
| WO | WO 2019-093221 | A1 | 5/2019 | | |
| WO | WO 2020/017467 | A1 | 1/2020 | | |

OTHER PUBLICATIONS

Korean Office action dated Apr. 28, 2025.
Japanese Office action dated Aug. 22, 2024.
International Search Report dated Sep. 7, 2020 for PCT/KR2021/006793.

* cited by examiner

1

20
30
10
30
20 stacking direction protruding direction (a)

stacking direction protruding direction (b)

13A          14A 13B     13C stacking
direction protruding direction

ALL-SOLID-STATE RECHARGEABLE BATTERY, STACKED RECHARGEABLE ALL-SOLID-STATE BATTERY, AND MANUFACTURING METHOD THEREOF

CROSS REFERENCE TO RELATED APPLICATIONS

This is the U.S. national phase application based on PCT Application No. PCT/KR2021/006793, filed Jun. 1, 2021, which is based on Japanese Patent Application No. 2020-150093, filed Sep. 7, 2020, and Korean Patent Application No. 10-2021-0016967, filed Feb. 5, 2021, the entire contents of all of which are hereby incorporated by reference.

TECHNICAL FIELD

An all-solid-state rechargeable battery, a stacked all-solid-state rechargeable battery, and a manufacturing method therefor.

BACKGROUND ART

In order to improve an energy density of an all-solid-state rechargeable battery, it is conceivable to stack and use a plurality of all-solid-state rechargeable batteries. When the plurality of all-solid-state rechargeable batteries are stacked and used, in order to improve rate characteristics and also, improve cycle characteristics by suppressing a short circuit, as shown in Patent Reference 1 (JP 2019-121558 A), either a positive electrode layer or a negative electrode layer (hereinafter, first electrode layer), a solid electrolyte layer disposed on the surface of each first electrode layer, the other one of the positive electrode layer or the negative electrode layer (hereinafter, second electrode layer) stacked on the outer surface of each solid electrolyte layer are configured to be laminated, and in addition, it is desirable to reduce protrusions and recesses of the surfaces of the all-solid-state rechargeable batteries and also, to reduce physical influences of the neighboring all-solid-state rechargeable batteries.

Patent Reference 1 provides an all-solid-state rechargeable battery which is manufactured by laminate-packing a stacked body with the aforementioned configuration, while placed on a support plate, and then, pressurizing the laminated pack from a stacking direction by an isostatic press and to reduce protrusions and recesses on the surface.

However, in the all-solid-state rechargeable battery manufactured by the pressurization in the stacking direction by the isostatic press in this way is confirmed to have a problem of exhibiting no charge and discharge capacity, which extremely rarely occurs. As a result of repeated examinations, the present inventors have discovered that a cause to the problem is a crack on a portion of a current-collecting portion, a thin protruding portion provided to electrically connect the first electrode layer to an external wire, or a cut of the current-collecting portion.

When the current-collecting portion is cracked or cut in this way, since the electrical connection between the first electrode layer and the external wire is cut off, a process of once more electrically connecting the current-collecting portion to the first electrode layer is further required, resultantly complicating the manufacture process of the all-solid-state rechargeable battery.

DISCLOSURE

Technical Problem

The present invention has been made in view of these problems, and an object of the present invention is to provide an all-solid-state rechargeable battery in which the protrusions and recesses of the surface of the all-solid-state rechargeable battery are reduced, cracks are less likely to occur in the current-collecting portion or the current-collecting portion is more difficult to be cut, and a method for manufacturing a solid-state rechargeable battery.

Technical Solution

The all-solid-state rechargeable battery according to the present invention is manufactured by the following manufacturing method.

The method for manufacturing an all-solid-state rechargeable battery includes manufacturing a stacked body in which solid electrolyte layers are stacked on both surfaces of the first electrode layer, the second electrode layer is stacked on the outer surface of each solid electrolyte layer, a thin current-collecting portion that electrically connects the first electrode layer to an external wire is disposed to protrude outward from the first electrode layer, and a current-collecting portion protection member that protects the current-collecting portion is arranged to wrap the current-collecting portion; pressurizing the stacked body in the stacking direction; and removing the current-collecting portion protection member after the pressurizing.

According to the manufacturing method of the all-solid-state rechargeable battery configured as described above, since the protruding portion of the current-collecting portion may be protected by wrapping with the current-collecting portion protection member while pressing the stacked body, it is possible to suppress problems in that the current collector is cracked or cut due to pressurization.

If the stacked body further includes an insulating layer disposed to wrap the side end surface of the first electrode layer, and the current-collecting portion protection member is an excess insulating layer integrally formed on the side end surface of the insulating layer, there is no gap between the insulating layer and the current-collecting portion protection member and cracking or cutting of the current-collecting portion may be further reduced.

If a cutout is formed between the excess insulating layer and the insulating layer, it is desirable because only the excess insulating layer may be easily removed. In order to more easily remove the excess insulating layer, it is desirable that the cutout is formed within a range of 5% or more and 99% or less of the thickness of the insulating layer in the stacking direction.

An all-solid-state rechargeable battery manufactured by the manufacturing method described above has the following characteristics. The all-solid-state rechargeable battery includes the first electrode layer, solid electrolyte layers stacked on both surfaces of the first electrode layer, the second electrode layer stacked on the outer surface of each solid electrolyte layer, respectively, an insulating layer disposed on a side end surface of the first electrode layer, and a thin current-collecting portion protruding from the first electrode layer through the insulating layer to the outside, wherein a side end surface of the insulating layer on the side from which the current-collecting portion protrudes has a roughened portion having a surface roughness that differs from that of another side end surface of the insulating layer.

As an example of the roughened portion, it may be mentioned that the roughened surface is formed compared to the other side end surface of the insulating layer.

More specifically, the roughened portion is formed when the excess insulating layer formed outside the side end surface of the insulating layer is removed, and the excess insulating layer wraps and protects the protruding portion of the current-collecting portion before removing the excess insulating layer.

A height of the roughened portion formed by removing the excess insulating layer with the insulating layer in the stacking direction may be 1% or more and 95% or less of the thickness of the insulating layer in the stacking direction.

As a specific embodiment of the present invention, the cutout between the insulating layer and the current collector protection member is formed at a depth of 5% or more and 99% or less of the thickness of the current collector protecting portion.

In order to further simplify the manufacturing process, it is desirable that the excess insulating layer and the insulating layer are integrally formed.

As a specific embodiment, it is desirable that the insulating layer consists of a resin or contains a resin.

If the insulating layer further includes an insulating filler, by the insulating filler, adhesiveness between the materials which form the insulating layer may be improved, and a strength of the insulating layer may be improved.

The insulating filler may include at least one material selected from fibrous resin, resin nonwoven fabric, alumina, magnesium oxide, silica, boehmite, barium titanate, barium carbonate, yttrium oxide, and manganese oxide.

If a portion or all of the outer edge of the insulating layer on the side where the current-collecting portion protrudes is disposed outside the outer edge of the second electrode layer, it is possible to suppress a short circuit due to physical contact between the first electrode layer and the second electrode layer (positive electrode layer and negative electrode layer).

In order to suppress a short circuit between the first electrode layer and the second electrode layer (positive electrode layer and negative electrode layer), it is desirable that a portion or all of the outer edge of the second electrode layer is disposed on the insulating layer.

In order to improve structural stability of the entire solid-state rechargeable battery, it is desirable that the first electrode layer is the positive electrode layer.

An all-solid-state rechargeable battery in which the solid electrolyte layer includes sulfide-based solid electrolyte that includes at least lithium, phosphorus, and sulfur may further improve battery performance.

The negative electrode layer includes a negative electrode active material that forms an alloy with lithium and/or a negative electrode active material that forms a compound with lithium, metallic lithium may be precipitated inside the negative electrode layer during charging, and 80% or more of the charging capacity of the negative electrode layer may be exhibited by metallic lithium.

The negative electrode layer may include one or more selected from amorphous carbon, gold, platinum, palladium, silicon, silver, aluminum, bismuth, tin, and zinc.

Advantageous Effects

According to the present invention, since the method of manufacturing an all-solid-state battery includes a pressurization process, protrusions and recesses on the surface of the all-solid-state rechargeable battery may be planarized. In addition, since the protruding portion of the current-collecting portion is wrapped and protected by the current-collecting portion protection member while the pressure is applied, pressure is directly applied to the current-collecting portion so that cracking near the protruding portion of the current-collecting portion or cutting of the current-collecting portion may be suppressed more than before.

MODE FOR INVENTION

Figure 1:
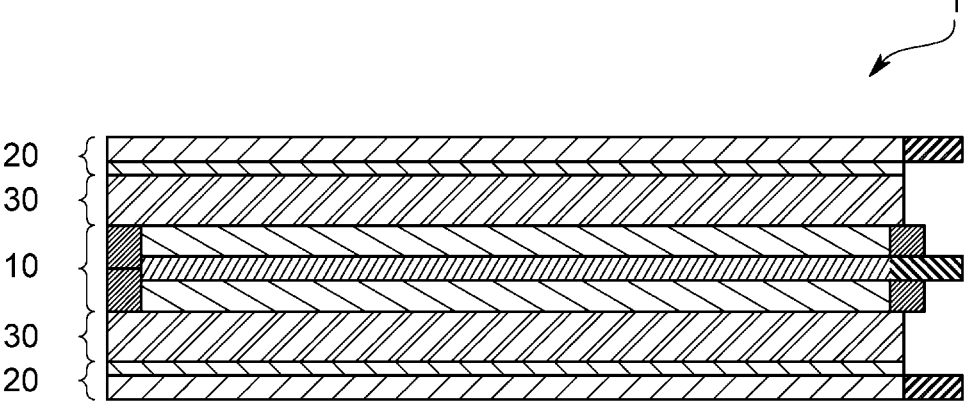
FIG. 1 is a cross-sectional view showing a schematic configuration of an all-solid-state rechargeable battery according to an embodiment.
Figure 1:
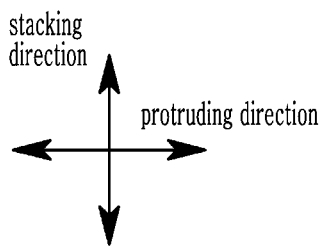

The present invention will be described more fully hereinafter with reference to the accompanying drawings, in which exemplary embodiments of the invention are shown. Also, in the current specification and drawings, components having substantially the same functions are denoted by the same reference numerals, so a duplicate description thereof will be omitted. In addition, each component in the drawings is appropriately enlarged or reduced for ease of explanation, and the size and ratio of each component in the drawings may differ from the actual ones.

1. Configuration of all-Solid-State Rechargeable Battery

First, the configuration of the all-solid-state rechargeable battery 1 according to the embodiment of the present invention will be described.

Figure 2:
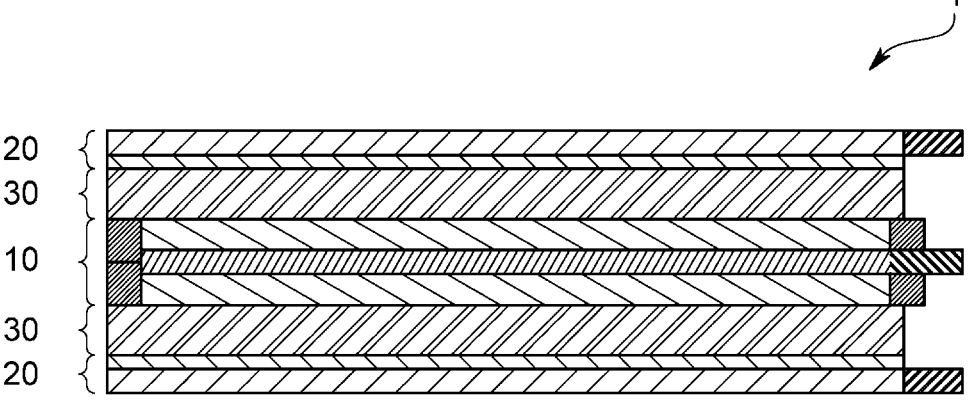
FIG. 2 is an enlarged cross-sectional view showing a schematic configuration of an all-solid-state rechargeable battery according to an embodiment.
Figure 2:
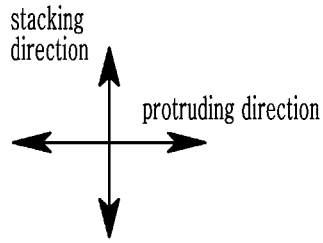

An all-solid-state rechargeable battery 1 according to the present embodiment includes a positive electrode layer 10, a negative electrode layer 20, and a solid electrolyte layer 30. More specifically, the all-solid lithium rechargeable battery 1 includes one of the positive electrode layer 10 and the negative electrode layer 20 (hereinafter, the first electrode layer), the solid electrolyte layer 30 stacked on both surfaces of the first electrode layer, and the other of the positive electrode layer 10 and the negative electrode layer 20 formed on the outer surface of each solid electrolyte layer, respectively (hereinafter referred to as a second electrode layer), and an insulating layer 13 disposed on the side end surface S of the first electrode layer. In the present embodiment, as shown in FIGS. 1 and 2, the first electrode layer is the positive electrode layer 10 and the second electrode layer is the negative electrode layer 20. On the other hand, the side end surface is an end of the periphery of each layer not in the stacking direction, and means an end of each layer in a direction perpendicular to the stacking direction of each layer.

(1-1. Positive Electrode Layer)

As shown in FIG. 2, the positive electrode layer 10 includes a positive electrode current collector 11 and a positive electrode active material layer 12.

Examples of the positive electrode current collector 11 include a plate-shaped body or a thin body made of stainless steel, titanium (Ti), nickel (Ni), aluminum (Al), or an alloy thereof.

As shown in FIG. 2, the positive electrode active material layer 12 is disposed on both surfaces of the positive electrode current collector 11. The positive electrode active material layer 12 includes a positive electrode active material and a solid electrolyte. The solid electrolyte included in the positive electrode active material layer 12 may or may not be of the same type as the solid electrolyte included in the solid electrolyte layer 30. Details of the solid electrolyte will be described in the section of the solid electrolyte layer 30 to be described later.

The positive electrode active material may be any positive electrode active material capable of reversibly intercalating and deintercalating lithium ions.

The positive electrode active material may be, for example, powdery or granular, and may include a lithium salt such as lithium cobalt oxide (hereinafter referred to as LCO), lithium nickel oxide, lithium nickel cobalt oxide, nickel cobalt aluminum. lithium salts such as lithium acid (hereinafter referred to as NCA), lithium nickel cobalt manganate (hereinafter referred to as NCM), lithium manganate, lithium iron phosphate, nickel sulfide, copper sulfide, sulfur, iron oxide, or vanadium oxide. These positive electrode active materials may be used alone, respectively, or may be used in combination of two or more types.

In addition, the positive electrode active material is desirably formed by including a lithium salt of a transition metal oxide having a layered rock salt type structure among the aforementioned lithium salts. Herein, "layered" refers to a thin sheet-like shape. In addition, "rock salt structure" refers to a sodium chloride-type structure, which is a type of crystal structure, and specifically, a structure in which face-centered cubic lattices formed by cations and anions, respectively are displaced from each other by only $\frac{1}{2}$ of the edge of the unit lattice.

A lithium salt of a transition metal oxide having such a layered rock salt structure may be, for example, a lithium salt of a ternary transition metal oxide such as $LiNi_xCo_yAl_zO_2$ (NCA), or $LiNi_xCo_yMn_zO_2$ (NCM) (provided that $0<x<1$, $0<y<1$, $0<z<1$, and $x+y+z=1$).

When the positive electrode active material includes the lithium salt of the ternary transition metal oxide having the layered rock salt structure, the energy density and thermal stability of the all-solid-state rechargeable battery 1 may be improved.

The positive electrode active material may be covered with a coating layer. Herein, as the coating layer of the present embodiment, any coating layer known as the coating layer of the positive electrode active material of the all-solid-state rechargeable battery 1 may be possible. An example of a coating layer may be $Li_2O$—$ZrO_2$, and the like.

In addition, since the positive electrode active material is formed from a lithium salt of a ternary transition metal oxide such as NCA or NCM, when nickel (Ni) is included as the positive electrode active material, the capacity density of the all-solid-state rechargeable battery 1 may be increased, and metal elution from the positive electrode active material in a charged state may be reduced. Accordingly, the all-solid-state rechargeable battery 1 according to the present embodiment may improve long-term reliability and cycle characteristics in a charged state.

Herein, examples of the shape of the positive electrode active material include particle shapes such as spherical and ellipsoidal shapes. In addition, the particle size of the positive electrode active material is not particularly limited, and may be within a range applicable to the positive electrode active material of a conventional all-solid-state rechargeable battery. On the other hand, the content of the positive electrode active material in the positive electrode layer 10 is not particularly limited, and any range applicable to the positive electrode layer 10 of the conventional all-solid-state rechargeable battery 1 may be used.

Further, in the positive electrode active material layer 12, in addition to the positive electrode active material and solid electrolyte described above, additives such as a conductive additive, a binder, a filler, a dispersant, and an ion conduction aid may be appropriately blended.

Examples of the conductive additive that can be incorporated into the positive electrode active material layer 12 include graphite, carbon black, acetylene black, ketjen black, a carbon fiber, a carbon nanotube, graphene, and a metal powder. In addition, a binder that can be incorporated into the positive electrode active material layer 12 may be for example a styrene butadiene rubber (SBR), polytetrafluoroethylene, polyvinylidene fluoride, polyethylene, and the like. In addition, a filler, a dispersant, an ion conduction aid, and the like that can be incorporated into the positive electrode active material layer 12 may be known materials generally usable for the electrode of the all-solid-state rechargeable battery 1.

(1-2. Negative Electrode Layer)

As shown in FIG. 2, for example, the negative electrode layer 20 includes a plate-shaped or thin negative electrode current collector 21 and a negative electrode active material layer 22 formed on the negative electrode current collector 21.

The negative electrode current collector 21 forms the outermost layer of the all-solid-state rechargeable battery 1 in the present embodiment. The negative electrode current collector 21 is desirably made of a material that does not react with lithium, that is, does not form an alloy or a compound. Examples of materials constituting the negative electrode current collector 21 may include copper (Cu), titanium (Ti), iron (Fe), cobalt (Co), and nickel (Ni) in addition to stainless steel. The negative electrode current collector 21 may be composed of any one of these metals, or may be composed of an alloy of two or more metals or a clad material.

The negative electrode active material layer 22 may include, for example, at least one of a negative electrode active material that forms an alloy with lithium and a negative electrode active material that forms a compound with lithium. The negative electrode active material layer 22 may be configured such that metallic lithium may be precipitated on one or both surfaces of the negative electrode active material layer 22 as described below by including such a negative electrode active material.

Examples of the negative electrode active material include amorphous carbon, gold, platinum, palladium (Pd), silicon (Si), aluminum (Al), bismuth (Bi), tin, antimony, and zinc. Herein, the amorphous carbon may include carbon black such as acetylene black, furnace black, ketjen black, etc., graphene, and the like.

The shape of the negative electrode active material is not particularly limited, and may be granular or, for example, a uniform layer such as a plating layer. In the case of the former, lithium ions pass through gaps between the granular negative electrode active materials, and a metal layer mainly composed of lithium is formed between the negative electrode active material layer 22 and the negative electrode current collector 21, and a portion of the lithium may exist in the negative electrode active material layer 22 by forming an alloy with a metal element in the negative electrode active material. On the other hand, in the case of the latter, the metal layer is precipitated between the negative electrode active material layer 22 and the solid electrolyte layer 30.

Among the above, the negative electrode active material layer 22 may include a mixture of amorphous carbon with a low specific surface area of 100 $m^2/g$ or less as measured by the nitrogen gas adsorption method and amorphous carbon with a high specific surface area of 300 $m^2/g$ or more as measured by the nitrogen gas adsorption method.

The negative electrode active material layer 22 may include only any one of these negative electrode active materials, or may include two or more types of negative electrode active materials. For example, the negative electrode active material layer 22 may include amorphous carbon alone as the negative electrode active material, and may include any one selected from gold, platinum, palladium, silicon, silver, aluminum, bismuth, tin, antimony, and zinc. Further, the negative electrode active material layer 22 may include a mixture of at least one selected from gold, platinum, palladium, silicon, silver, aluminum, bismuth, tin, antimony, and zinc and amorphous carbon.

A mixing ratio (mass ratio) of the mixture of amorphous carbon and the above-mentioned metal such as gold may be desirably about 1:1 to 1:3, and the negative electrode active material is composed of these materials, and thus characteristics of the all-solid-state rechargeable battery 1 may be also improved.

As the negative electrode active material, when at least one selected from gold, platinum, palladium, silicon, silver, aluminum, bismuth, tin, antimony, and zinc is used together with amorphous carbon, the particle size of these negative electrode active materials may be 4 µm or less. In this case, the characteristics of the all-solid-state rechargeable battery 1 are further improved.

In addition, when the negative electrode active material is a material capable of forming an alloy with lithium, for example, at least one selected from gold, platinum, palladium, silicon, silver, aluminum, bismuth, tin, antimony, and zinc, the negative electrode active material layer 22 may be a layer made of these metals. For example, the metal layer may be a plating layer.

The negative electrode active material layer 22 may also include a binder as needed. Examples of the binder may include a styrene butadiene rubber (SBR), polytetrafluoroethylene (PET), polyvinylidene fluoride, and polyethylene oxide. The binder may be composed of 1 type, or may be composed of 2 or more types. By including the binder in the negative electrode active material layer 22 in this way, separation of the negative electrode active material may be suppressed, especially when the negative electrode active material is granular.

A content of the binder included in the negative electrode active material layer 22 may be, for example, 0.3 mass % or more and 20.0 mass % or less, desirably 1.0 mass % or more and 15.0 mass % or less, more desirably, 3.0 mass % or more and 15.0 mass % or less based on the total mass of the negative electrode active material layer 22.

In addition, additives used in the conventional all-solid-state rechargeable battery 1, such as a filler, a dispersing material, an ion conducting material, and the like may be suitably blended into the negative electrode active material layer 22.

A thickness of the negative electrode active material layer 22 is not particularly limited when the negative electrode active material is granular, but may be, for example, 1.0 µm or more and 20.0 µm or less, desirably 1.0 µm or more and 10 µm or less. With such a thickness, the resistance value of the negative electrode active material layer 22 may be sufficiently reduced while the aforementioned effects of the negative electrode active material layer 22 may be sufficiently obtained, and characteristics of the all-solid-state rechargeable battery 1 may be sufficiently improved.

On the one hand, the thickness of the negative electrode active material layer 22 may be, for example, 1.0 nm or more and 100.0 nm or less, when the negative electrode active material forms a uniform layer. The upper limit of the thickness of the negative electrode active material layer 22 in this case may be desirably 95 nm, more desirably 90 nm, and still more desirably 50 nm.

Meanwhile, the present invention is not limited to the aforementioned embodiment, and the negative electrode active material layer 22 may adopt any configuration that can be used as the negative electrode active material layer 22 of the all-solid-state rechargeable battery 1. For example, the negative electrode active material layer 22 may be a layer including the aforementioned negative electrode active material, a solid electrolyte, and a conductive additive for the negative electrode layer.

In this case, for example, a metal active material or a carbon active material may be used as the negative electrode active material. Examples of the metal active material may include a metal such as lithium (Li), indium (In), aluminum (Al), tin (Sn), and silicon (Si), an alloy thereof, and the like. Further, the carbon active material may include, for example, artificial graphite, a graphite carbon fiber, calcined resin carbon, thermal decomposition vapor grown carbon, coke, mesocarbon microbeads (MCMB), calcined resin of furfuryl alcohol, polyacene, a pitch-based carbon fiber, a vapor grown carbon fiber, natural graphite, and non-graphitizable carbon. On the other hand, these negative electrode active materials may be used alone or may be used in combination of two or more.

The compounds such as the conductive agent and the solid electrolyte included in the positive electrode active material layer 12 may be used as the conductive additive for the negative electrode layer and the solid electrolyte. For this reason, the description of these configurations is omitted herein.

(1-3. Solid Electrolyte Layer)

The solid electrolyte layer 30 is a layer formed between the positive electrode layer 10 and the negative electrode layer 20 and includes a solid electrolyte.

In the present embodiment, the solid electrolyte layer 30 is stacked between the positive electrode layer 10 and the negative electrode layer 20. A thickness of the solid electrolyte layer 30 may be 5 μm or more and 100 μm or less in the state of being completed as a battery. It is desirable that this thickness is 8 μm or more and 50 μm or less, and it is more desirable that they are 10 μm or more and 30 μm or less.

The solid electrolyte may be, for example, powdery, and may be composed of, for example, a sulfide-based solid electrolyte material.

The sulfide-based solid electrolyte material may be, for example, $Li_2S$—$P_2S_5$, $Li_2S$—$P_2S_5$—$LiX$ (wherein X is a halogen element, for example I, Br, or CI), $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (wherein m and n are a positive number and Z is Ge, Zn, or Ga), $Li_2S$—$GeS_2$, $Li_2S$—$SiS_2$—$Li_3PO_4$, $Li_2S$—$SiS_2$-$Li_pMO_q$ (wherein p and q are a positive number and M is P, Si, Ge, B, Al, Ga, or In), and the like.

Herein, the sulfide-based solid electrolyte material may be produced by treating a starting material (e.g., $Li_2S$, $P_2S_5$, etc.) by a melt quenching method or a mechanical milling method. Further, heat treatment may be performed after these treatments. The solid electrolyte may be amorphous, crystalline, or a mixture of both.

Further, as the solid electrolyte, among the above sulfide-based solid electrolyte materials, it is desirable to use a material containing sulfur and at least one element selected from silicon, phosphorus, and boron. Accordingly, lithium conductivity of the solid electrolyte layer 30 is improved, and battery characteristics of the all-solid-state rechargeable battery 1 are improved. In particular, as a solid electrolyte, it is desirable to use one containing sulfur(S), phosphorus (P) and lithium (Li) as at least constituent elements, and particularly, it is more desirable to use one containing $Li_2S$—$P_2S_5$.

Herein, when using a material containing $Li_2S$—$P_2S_5$ as a sulfide-based solid electrolyte material forming the solid electrolyte, the mixing molar ratio of $Li_2S$ and $P_2S_5$ may be, for example, in the range of $Li_2S$:$P_2S_5$=50:50 to 90:10.

In addition, the solid electrolyte layer 30 may further include a binder. The binder included in the solid electrolyte layer 30 may include, for example, a styrene butadiene rubber (SBR), polytetrafluoroethylene, polyvinylidenefluoride, polyethylene, and polyacrylic acid, etc. The binder included in the solid electrolyte layer 30 may be the same type as or may be of a different type from the binders in the positive electrode active material layer 12 and the negative electrode active material layer 22.

(1-4. Insulating Layer)

The insulating layer 13 is disposed in close contact with the side end surface S of the positive electrode layer 10 so as to cover the entire side end surface S of the positive electrode layer 10, which is, for example, the first electrode layer in the present embodiment.

The insulating layer 13 may be formed using an insulating layer material 13A, which is a material that does not pass electricity, but a material constituting the insulating layer material 13A may be, for example, a resin film including a resin such as polypropylene, polyethylene, or a copolymer thereof. Such a resin film may be brought into close contact with the positive electrode layer 10 by pressurization such as, for example, an isostatic press to make it difficult to peel off. In addition, the insulating layer material 13A may be a mixture of these resins with an insulating filler or the like.

When the insulating layer material 13A includes an insulating filler, adhesiveness between the insulating layer materials 13A becomes good, and a strength of the insulating layer 13 may be improved when the insulating layer 13 is formed or used by the insulating layer material 13A. In addition, when the insulating layer material 13A includes an insulating filler together with a resin, it is possible to form fine protrusions and recesses on the surface of the insulating layer 13 by mixing and congesting the insulating filler. The protrusions and recesses shape of the surface of the insulating layer 13 makes it difficult for the solid electrolyte layer 30 to peel off from the insulating layer 13 when the solid electrolyte layer 30 is stacked.

The insulating filler may have various shapes such as particulate, fibrous, needle-shaped or plate-shaped products. Among these, it is desirable to use a fiber-type or non-woven fabric-type insulating filler as one that reproduces the above effect particularly remarkably. From the viewpoint of suppressing cost increase, the insulating filler may include, for example, one or more materials selected from a fibrous resin, a resin nonwoven fabric, alumina, magnesium oxide, silica, boehmite, barium titanate, barium carbonate, yttrium oxide, and manganese oxide.

(1-5. Current-Collecting Portion)

The positive electrode current collector 11 and the negative electrode current collector 21 are connected to external wire through a current-collecting portion.

Figure 3:
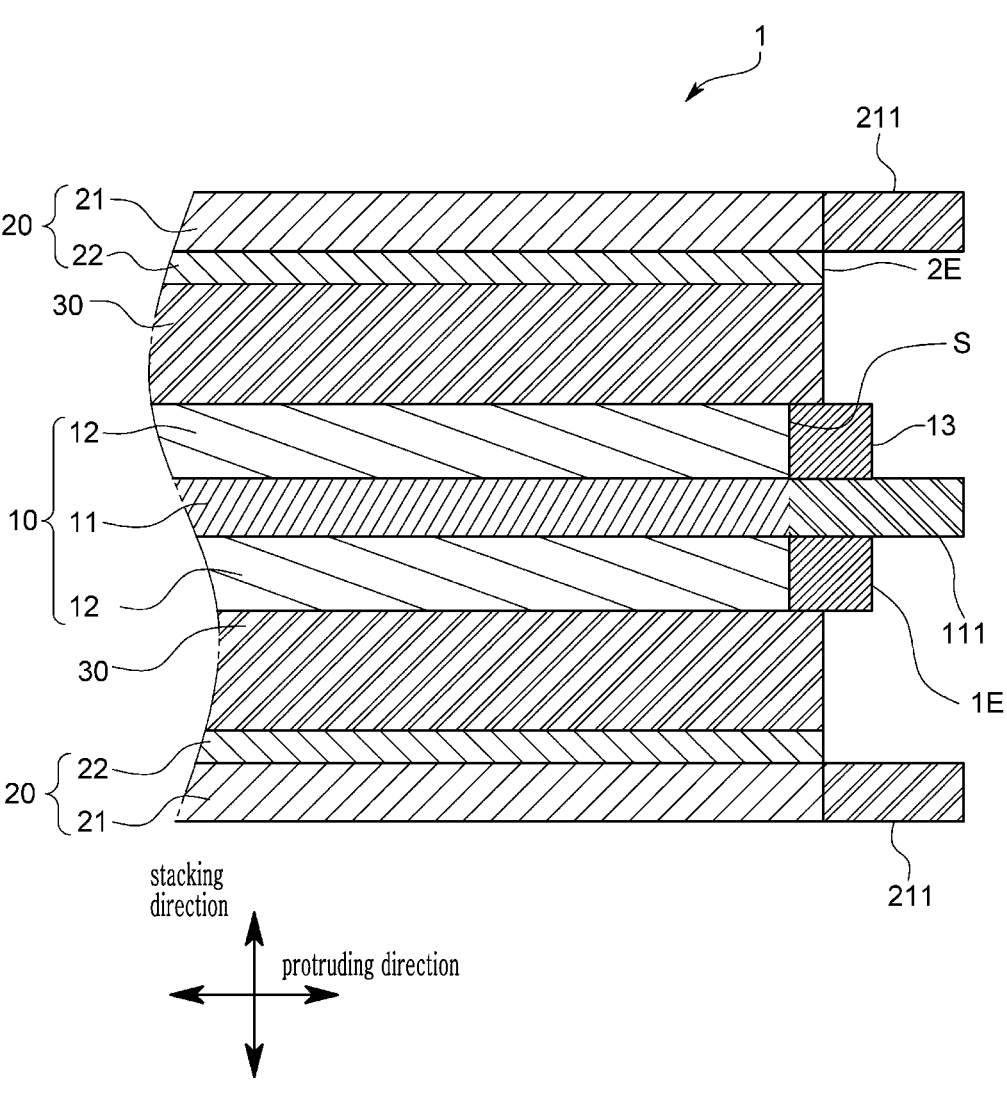
FIG. 3 is an enlarged plan view showing a schematic configuration of an all-solid-state rechargeable battery according to an embodiment.

As shown in FIGS. 2 and 3, the current-collecting portion includes, for example, a positive electrode current-collecting portion 111 electrically connecting the positive electrode current collector 11 to an external wire, and a negative electrode current-collecting portion 211 electrically connecting the negative electrode current collector 21 connected to an external wire. The positive electrode current-collecting portion 111 may be thin, made of the same material as the positive electrode current collector 11. The positive electrode current-collecting portion 111 extends from the positive electrode current collector 11 and is integrally formed with the positive electrode current collector 11. In each drawing, an imaginary line is indicated between the positive electrode current collector 11 and the positive electrode current-collecting portion 111.

In the present embodiment, the positive electrode current-collecting portion 111 connecting the positive electrode current collector 11 of the positive electrode layer 10 that is the first electrode layer, to an external wire is configured to penetrate the insulating layer 13 and protrude to the outside. Meanwhile, for convenience of description, in FIGS. 1 to 10, the direction in which the positive electrode current-collecting portion 111 protrudes is referred to as a protrusion direction, and in a plan view of each layer constituting the all-solid-state rechargeable battery 1 viewed from the stacking direction, a direction perpendicular to the protrusion direction is referred to as a width direction.

The negative electrode current-collecting portion 211 is, for example, a thin one formed of the same material as the negative electrode current collector 21. The negative electrode current-collecting portion 211 is integrally formed as negative electrode current collector 21 so as to extend from negative electrode current collector 21. In FIG. 3, an imaginary line is indicated between the negative electrode current collector 21 and the negative electrode current-collecting portion 211.

More specifically, when the all-solid-state rechargeable battery 1 is used, the positive electrode current collector 11 is connected to the wire through the positive electrode current-collecting portion 111 and a terminal (not shown, current collecting tab) mounted on one end of the positive electrode current collector 11. Similarly, when the all-solid-state rechargeable battery 1 is used, the negative electrode current collector 21 is connected to the wire through the negative electrode current-collecting portion 211 and a terminal (not shown, current collecting tab) mounted on one end of the negative electrode current collector 21.

On the other hand, a thickness of the positive electrode current-collecting portion 111 and the negative electrode current-collecting portion 211 may be appropriately changed by the thickness of the integrally formed positive electrode current collector 11 or negative electrode current collector 21, but may be, for example, 1 µm or more 50 µm or less, or more desirably 5 µm or more and 30 µm or less.

2. Method for Manufacturing Solid-State Rechargeable Battery

Subsequently, one example of the method and procedure for manufacturing the all-solid-state rechargeable battery 1 according to the present embodiment will be described with reference to FIGS. 4 to 8.

The method for manufacturing the all-solid-state rechargeable battery 1 according to the present embodiment includes the following steps.

(2-1. Manufacture of Positive Electrode Layer)

Figure 4:
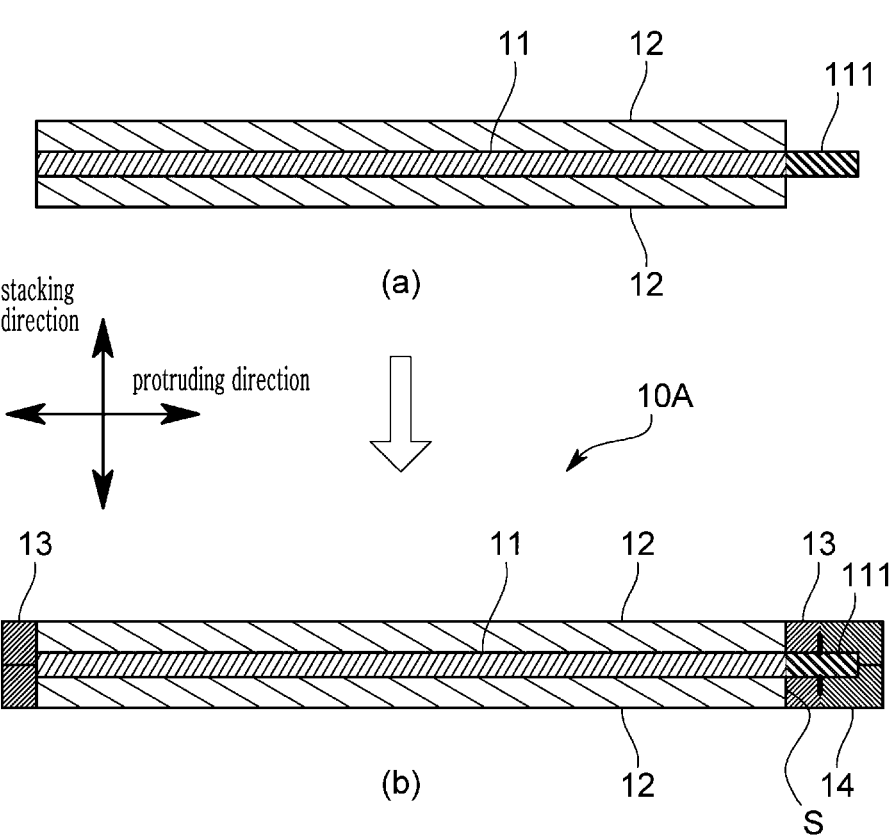
FIG. 4 is a schematic view showing a manufacturing method of an all-solid-state rechargeable battery according to an embodiment.

The materials constituting the positive electrode active material layer 12 (positive electrode active material, binder, etc.) are added to a non-polar solvent to prepare a positive electrode active material layer coating liquid (this positive electrode active material layer coating liquid in a slurry form or a paste form). The coating liquid used to form the other layers is also the same.) is prepared. Subsequently, as shown in FIG. 4 (*a*), the obtained positive electrode active material layer coating liquid is applied to both surfaces of the positive electrode current collector 11, dried, and then the positive electrode current collector 11 and the coated positive electrode active material layer 12 is penetrated into in a rectangular plate shape using a Thomson blade or the like. The stacked body obtained in this way is called a positive electrode structure. This positive electrode structure is placed on an aluminum plate covered with PET film, an approximately rectangular ring-shaped insulating layer material 13A forming the insulating layer 13 is placed around the positive electrode structure, a PET film is further placed over all of them, and by a laminate pack, the resultant is subjected to isostatic pressure treatment (isostatic press) to manufacture the positive electrode layer 10A before cutting as shown in FIG. 4 (*b*).

(2-2. Manufacture of Negative Electrode Layer)

Figure 5:
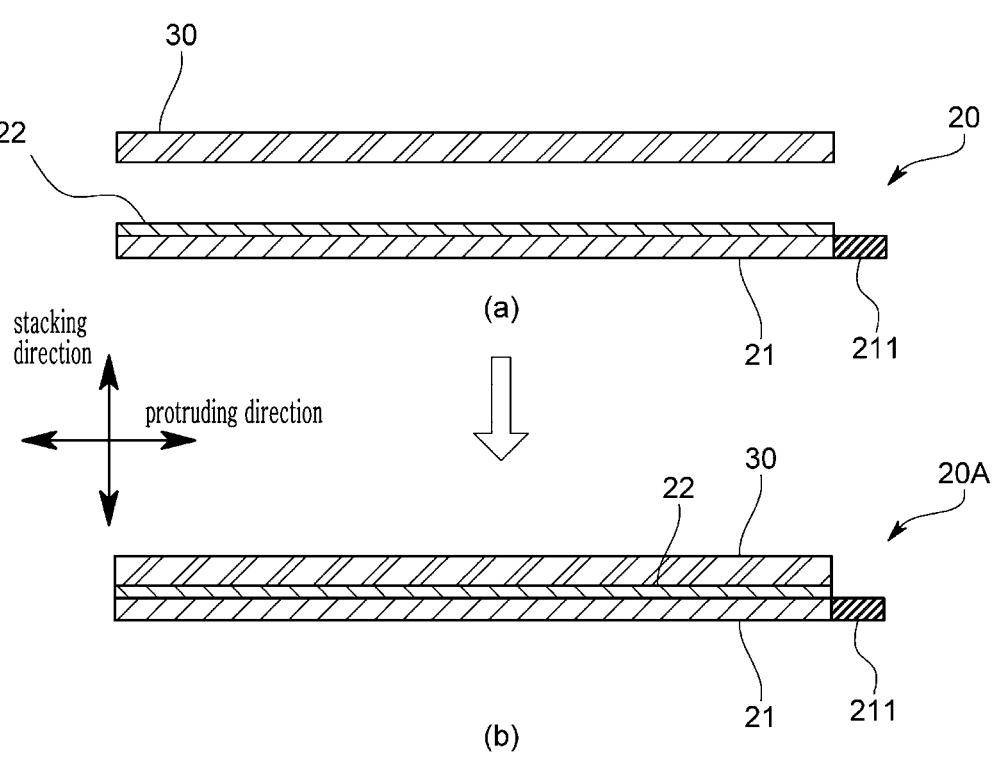
FIG. 5 is a schematic view showing a manufacturing method of an all-solid-state rechargeable battery according to an embodiment.

The materials constituting the negative electrode active material layer 22 (negative electrode active material, binder, etc.) are added to a polar solvent or a non-polar solvent to prepare a negative electrode active material layer coating liquid. Subsequently, as shown in FIG. 5 (*a*), the obtained negative electrode active material layer coating liquid is applied onto the negative electrode current collector 21 and dried. The negative electrode layer 20 is produced by penetrating this into a rectangular plate shape with a Thomson blade or the like.

(2-3. Manufacture of Solid Electrolyte Layer)

The solid electrolyte layer 30 may be made of a solid electrolyte formed from a sulfide-based solid electrolyte material. The manufacturing method of the solid electrolyte is as follows.

First, the starting materials are treated by a melt quenching method or a mechanical milling method. For example, in the case of using the melt quenching method, starting materials (e.g., $Li_2S$, $P_2S_5$, etc.) are mixed in a predetermined amount to obtain pellets and the pellets are reacted in a vacuum at a predetermined reaction temperature, followed by quenching to obtain a sulfide-based solid electrolyte material. On the other hand, the reaction temperature of the mixture of $Li_2S$ and $P_2S_5$ may be desirably 400° C. to 1000° C., and more desirably 800° C. to 900° C. In addition, the reaction time may be desirably 0.1 hour to 12 hours, more desirably 1 hour to 12 hours. In addition, the quenching temperature of the reactants may be usually 10° C. or less, desirably 0° C. or less, and the quenching rate is usually about 1° C./sec to 10000° C./sec, desirably 1° C./sec to 1000° C./sec.

In the case of using a mechanical milling method, a sulfide-based solid electrolyte material may be produced by reacting by stirring the starting materials (e.g., $Li_2S$, $P_2S_5$, etc.) using a ball mill or the like. On the other hand, the stirring speed and stirring time in the mechanical milling method are not particularly limited, but the production speed of the sulfide-based solid electrolyte material may be increased as the stirring speed is fast, and a conversion ratio of the raw material to the sulfide-based solid electrolyte material may be increased as the stirring time is long.

Thereafter, the mixed raw materials obtained by the melt quenching method or the mechanical milling method are heat-treated at a predetermined temperature and then pulverized to prepare a particulate solid electrolyte. When a solid electrolyte has a glass transition point, it may change from amorphous to crystalline by heat treatment.

Subsequently, a solid electrolyte layer coating liquid including the solid electrolyte obtained by the above method and other additives such as a binder and a dispersion medium is prepared. As the dispersion medium, a generally-used non-polar solvent such as xylene or diethylbenzene may be used. Alternatively, a polar solvent having relatively low reactivity with the solid electrolyte may be used. A concentration of the solid electrolyte and other additives may be appropriately adjusted depending on the composition of the solid electrolyte layer 30 to be formed and the viscosity of the liquid composition.

The liquid composition of the solid electrolyte described above is applied with a blade on the surface of the release-treated PET film, dried, and then a solid electrolyte sheet on which the solid electrolyte layer 30 is formed is manufactured on the PET film.

(2-4. Stacking Process)

On one surface of the negative electrode layer 20 manufactured as described above, as shown in FIG. 5 (*a*), a solid electrolyte sheet punched out to have the same shape as or a larger shape than the negative electrode layer 20 is stacked, and these are isostatically pressed and thereby, as shown in FIG. 5 (b), the negative electrode layer 20 and the solid electrolyte layer 30 are brought into close contact and integrated. In the case where the solid electrolyte layer 30 is larger than the negative electrode layer 20, a portion of the solid electrolyte layer 30 protruding outward when stacked on the negative electrode layer 20 may be removed. This stacked body is referred to as an electrolyte-negative electrode structure 20A.

Figure 6:
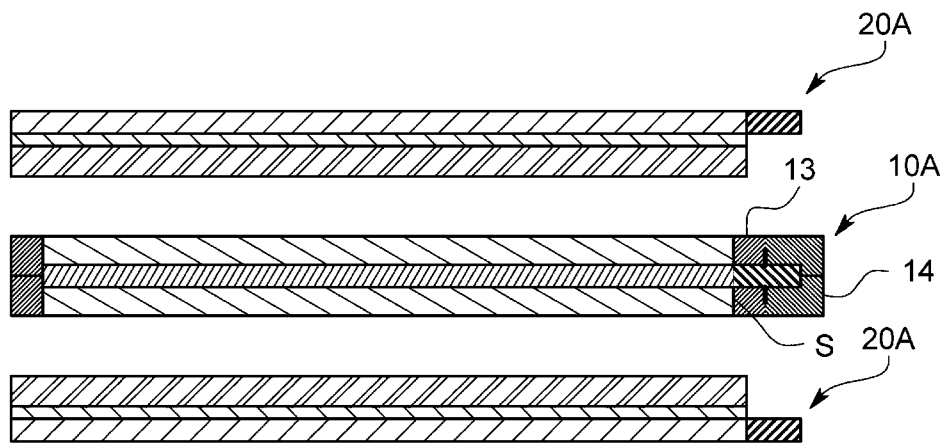
FIG. 6 is a schematic view showing a manufacturing method of an all-solid-state rechargeable battery according to an embodiment.
Figure 6:
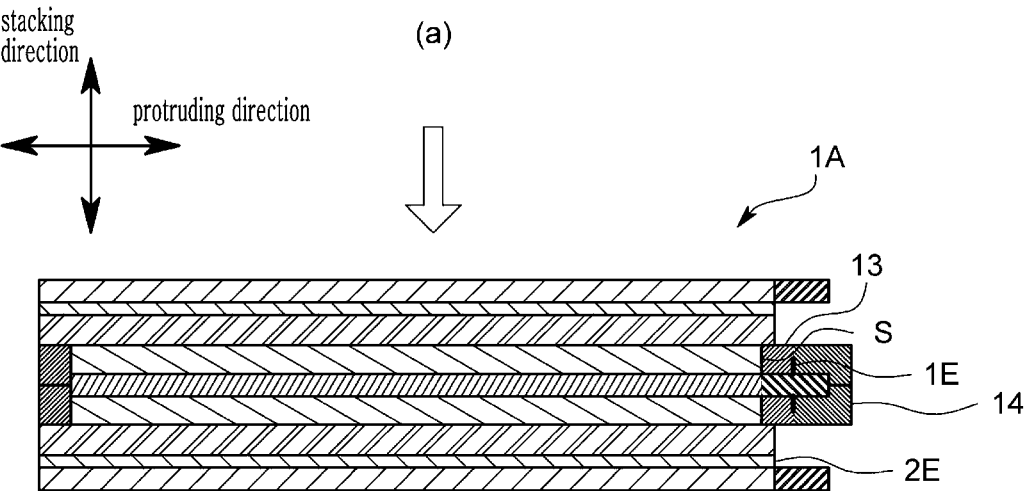

Then, as shown in FIG. 6 (a), the aforementioned positive electrode layer 10A before cutting is stacked so as to be sandwiched between two electrolyte-negative electrode structures 20A on both surfaces thereof. At this time, the electrolyte-negative electrode structure 20A is stacked on both surfaces of the positive electrode layer 10 so that the solid electrolyte layer 30 of the electrolyte-negative electrode structure 20A is in contact with each other, and all of these are laminate-packed and pressed under isostatic pressure, so that an untreated all-solid-state rechargeable battery 1A, which is a laminate as shown in FIG. 6 (b), is manufactured.

In the present embodiment, in the stacking process described above, as shown in FIGS. 2, 3, and 6 (b), the outer edge 1E of the insulating layer 13 is present outside the outer edge 2E of the negative electrode layer 20. The outer edge 1E of the insulating layer 13 may be displaced from the outer edge 2E of the negative electrode layer 20 by, for example, 1 μm or more and 2 mm or less. The range of this displaced width is desirably 0.05 mm or more and 1 mm or less, and more desirably 0.1 mm or more and 0.5 mm or less.

More specifically, as shown in FIGS. 2, 3 and 6 (b), in the present embodiment, at least a portion of the outer edge 2E of the negative electrode layer 20 is present inward than the outer edge 1E of the insulating layer 13 provided around the positive electrode layer 10, and it may be desirably stacked on the insulating layer 13. With this configuration, for example, in the all-solid-state rechargeable battery 1 shown in FIG. 2, even when the negative electrode layer 20 is pressed against the positive electrode layer 10 side by external pressure and deformed, a physical short circuit between the positive electrode layer 10 and the negative electrode layer 20 may be suppressed.

In the all-solid-state rechargeable battery 1 shown in FIG. 2, a physical short circuit easily occurs between the outer edge 2E of the negative electrode layer 20 and the positive electrode layer 10 via the positive electrode current-collecting portion 111, as shown in FIG. 6 (b), a portion of the outer edge 1E of the insulating layer 13 covering the positive electrode layer 10 from the side end surface S may be present outside the outer edge 2E of the negative electrode layer 20, at least on the side where the positive electrode current-collecting portion 111 protrudes. In this way, a short circuit between the positive electrode layer 10 and the negative electrode layer 20 due to a contact between the outer edge 2E of the negative electrode current collector 21 or the negative electrode active material layer 22 and the positive electrode current-collecting portion 111 may be suppressed. One side or all sides of the outer edge 1E of the insulating layer 13 may be present outside the outer edge 2E of the negative electrode layer 20.

As shown in FIGS. 2, 3 and 6 (b), the outer edge 1E of the insulating layer 13 is the outermost edge (outer side edge) in the direction perpendicular to the stacking direction among the side end surfaces of the insulating layer 13, and more specifically, refers to the outer edge of the insulating layer 13 on the side where the positive electrode current-collecting portion 111 protrudes. In addition, the outer edge 2E of the negative electrode layer 20 refers to the outermost edge (outer edge) in the direction perpendicular to the stacking direction among the side end surfaces of the negative electrode layer 20, and in the present embodiment, for example, it is the outermost edge of the side end surface of the negative electrode current collector 21 or the negative electrode active material layer 22 in a direction perpendicular to the stacking direction thereof.

(2-5. Isostatic Press)

Hereinafter, the pressurization treatment (pressurization process) by the aforementioned isostatic press is described. The isostatic press is performed by arranging a support plate 4 such as a SUS plate, for example, on at least one surface side of the stacked body. By this isostatic press, pressurization treatment may be performed from the stacking direction on each stacked body forming the positive electrode layer 10A, the electrolyte-negative electrode structure 20A, or the untreated all-solid-state rechargeable battery 1A before cutting. A pressure medium of the isostatic press may be liquids such as water and oil, powders, and the like. It is more desirable to use a liquid as the pressure medium.

The pressure in the isostatic press is not particularly limited, but is, for example, 10 to 1000 MPa, or desirably 100 to 500 MPa. In addition, the pressurization time is not particularly limited, and may be, for example, 1 to 120 minutes, or desirably 5 to 30 minutes. Also, the temperature of the pressure medium during pressurization is not particularly limited, and may be, for example, 20° C. to 200° C., or desirably 50° C. to 100° C.

On the other hand, at the time of isostatic pressing, it is desirable that the stacked body constituting the all-solid-state rechargeable battery 1 is stacked with a resin film or the like together with the support plate 4 to be shielded from the external atmosphere. Compared with other pressing methods such as roll pressing, isostatic pressing is advantageous from the viewpoint of suppressing cracking of each layer constituting the all-solid-state rechargeable battery 1 and preventing warping of the all-solid-state rechargeable battery 1.

(2-6. Characteristics of the Manufacturing Method of the all-Solid-State Rechargeable Battery According to the Present Invention)

However, the characteristics of the manufacturing method of the all-solid-state rechargeable battery 1 according to the present invention is that the entire current-collecting portion 111 or 211 is covered from both sides by the current-collecting portion protection member 14 that surrounds and protects the protruding portion of the current-collecting portion 111 or 211 during the pressurization process described above.

In the present embodiment, the protruding portion of the positive electrode current-collecting portion 111 mounted on the positive electrode current collector 11 of the positive electrode layer 10, which is the first electrode layer inserted in the center, is covered by the current-collecting portion protection member 14. The current-collecting portion protection member 14 may have a surface larger than the area of the positive electrode current-collecting portion 111 so as to cover the entire positive electrode current-collecting portion 111 without gaps at least while lacking isostatic pressure, and its shape is not particularly limited.

Figure 7:
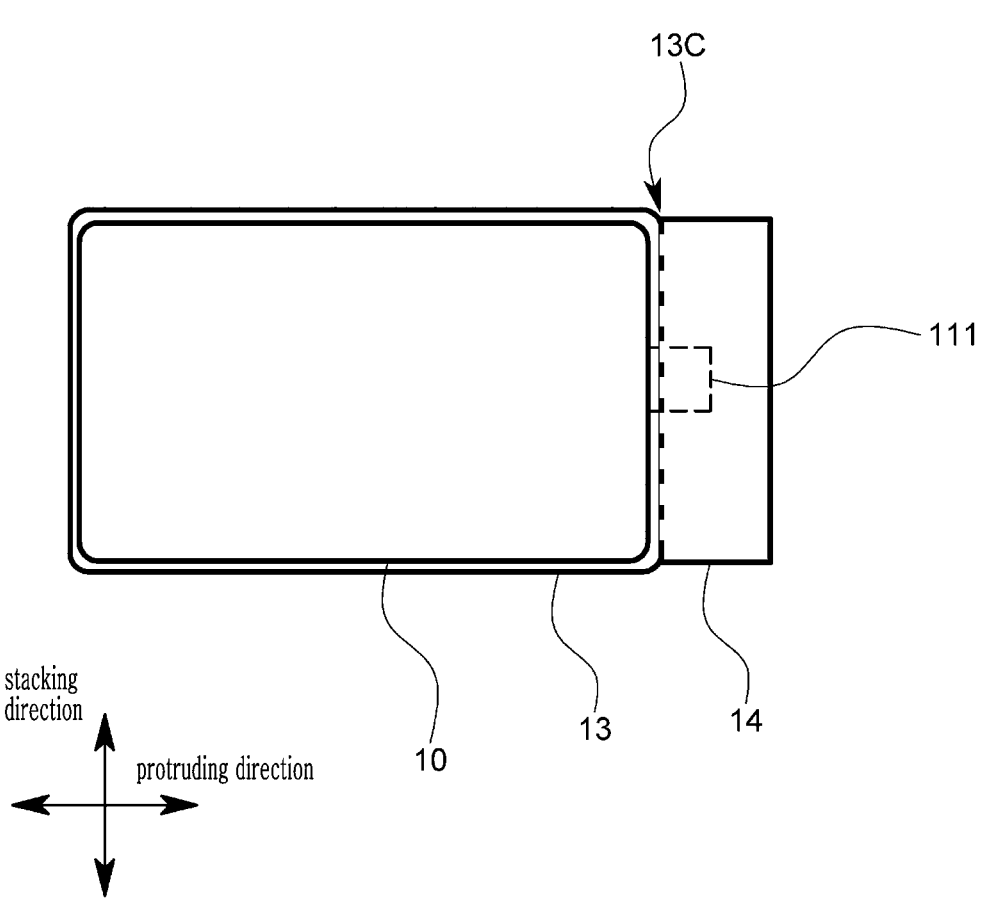
FIG. 7 is a schematic view of an excess insulating layer, an insulating layer, and a positive electrode layer of an all-solid-state rechargeable battery viewed in a stacking direction according to an embodiment.

For example, as shown in FIG. 7, from the viewpoint of ease of manufacture, it is preferable that the current-collecting portion protection member 14 is integrally formed with the insulating layer 13, has the same width and thickness as the width of the insulating layer 13, and is formed with the excess insulating layer 14 in the form of a rectangular plate protruding larger than the positive electrode current-collecting portion 111 in the same direction as the positive electrode current-collecting portion 111 from the insulating layer 13. On the other hand, in each drawing, an imaginary line is shown between the insulating layer 13 and the excess insulating layer 14 for ease of understanding.

Figure 8:
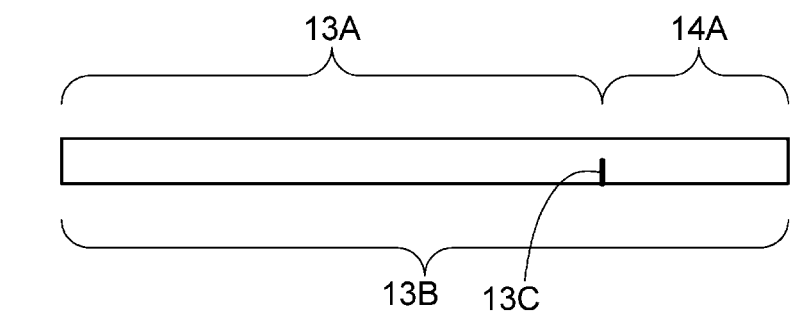
FIG. 8 is a schematic view showing a side end surface of an excess insulating layer material.
Figure 8:
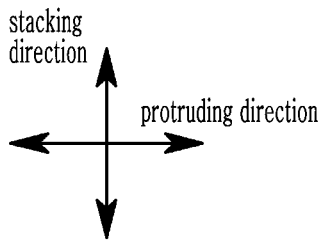

In the present embodiment, as shown in FIG. 8, the excess insulating layer 14 is formed of the current-collecting portion protection member material 14A integrally formed on the end portion of the ring-shaped insulating layer material 13A. In the present embodiment, as shown in FIG. 8, two sheets of excess insulating layer material 13B including insulating layer material 13A and current-collecting portion protection member material 14A are prepared, and these two sheets of excess insulating layer material 13B are arranged so that both surfaces of the entire positive electrode current-collecting portion 111 are sandwiched by the current-collecting portion protection member material 14A, and then subjected to pressure treatment by isostatic pressure, and thereby as shown in FIG. 7, the positive electrode current-collecting portion 111 is covered with the excess insulating layer 14. On the other hand, FIG. 8 is a schematic view showing the side end surface of the excess insulating layer material 13B.

The current-collecting portion protection member material 14A may be formed independently of the insulating layer material 13A, but as shown in FIGS. 7 and 8, it is desirable from the viewpoint of ease of manufacture that the it may be integrally formed with the insulating layer material 13A at the end portion of the insulating layer material 13A. A thickness of the current-collecting portion protection member 14 and for example, one sheet of current-collecting portion protection member material 14A stacked on one side of the positive electrode current-collecting portion 111 may be desirably 10 μm or more and 500 μm or less, more desirably 50 μm or more and 300 μm or less, or especially desirably 80 μm or more and 200 μm or less. Also, this desirable thickness varies depending on the thickness of the positive electrode layer 10, and is desirably close to the thickness of the positive electrode active material layer 12.

A total thickness of the current-collecting portion protection member 14 in the state where the current-collecting portion protection member material 14A is stacked on both surfaces of the positive electrode current-collecting portion 111 may be desirably 20 μm or more and 1000 μm or less, more desirably 100 μm or more and 600 μm or less, or especially desirably 160 μm or more and 400 μm or less. As described above, this desirable total thickness also varies depending on the thickness of the positive electrode layer 10, and a product having a thickness close to the total thickness of the two positive electrode active material layers 12 formed on both surfaces of the positive electrode current collector 11 may be suitable.

In this way, a thickness of the current-collecting portion protection member 14 may be a thickness corresponding to the thickness of the positive electrode active material layer 12, so that a step difference between the current-collecting portion protection member 14 covering the positive electrode current-collecting portion 111 and cracking or cutting of the positive electrode current-collecting portion 111 during the pressurization treatment may be more effectively suppressed. The two sheets of current-collecting portion protection member material 14A stacked one by one on both surfaces of the positive electrode current-collecting portion 111 may have the same or different thicknesses. In addition, the thickness of the insulating layer 13 and the thickness of the current-collecting portion protection member 14 may be the same as or different from each other. Since the manufacturing process can be simplified, the current-collecting portion protection member 14 is desirably made of the same material as the insulating layer 13 described above, but is not limited thereto.

The timing of covering the positive electrode current-collecting portion 111 with the current-collecting portion protection member 14 is not particularly limited, and the positive electrode current-collecting portion 111 may be covered with the current-collecting portion protection member 14 during isostatic pressure pressing. For example, when the current-collecting portion protection member material 14A forming the current-collecting portion protection member 14 is not integrally formed with the insulating layer material 13A, prior to stacking the positive electrode active material layer 12 on the positive electrode current collector 11, the positive electrode current-collecting portion 111 may be covered with the current-collecting portion protection member 14.

Figure 9:
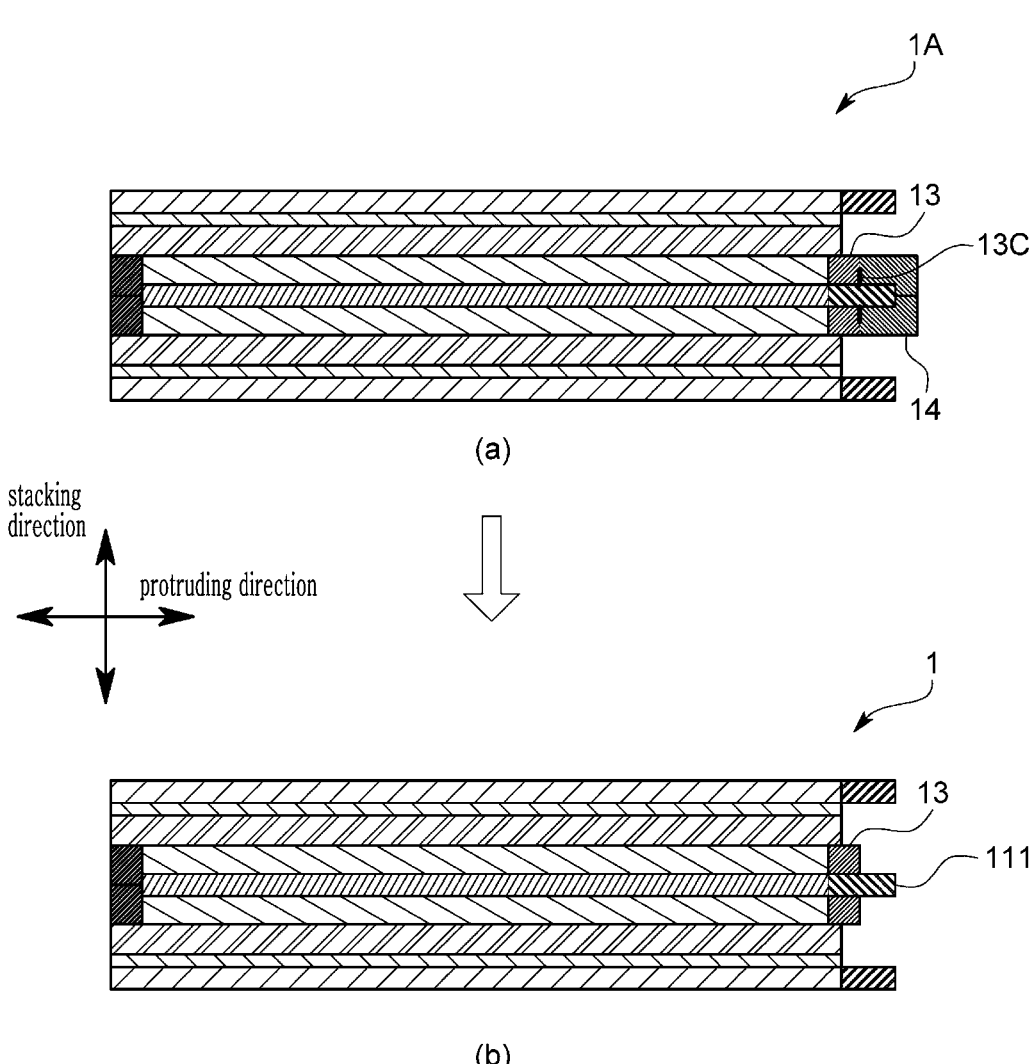
FIG. 9 is a schematic view showing a manufacturing method of an all-solid-state rechargeable battery according to an embodiment.

As described above, is isostatic pressure is applied while the positive electrode current-collecting portion 111 is covered with the current-collecting portion protection member 14, and all the layers constituting the solid-state rechargeable battery 1 are brought into close contact to form an untreated all-solid-state rechargeable battery 1A. After that, as shown in FIG. 9, the all-solid-state rechargeable battery 1 is completed by going through a removal process of removing the excess insulating layer 14 that is the current-collecting portion protection member 14, from the untreated all-solid-state rechargeable battery 1A. Meanwhile, in FIG. 9, FIG. 9 (a) shows an untreated all-solid-state rechargeable battery 1A, and FIG. 9 (b) shows an all-solid-state rechargeable battery 1 after removing the excess insulating layer 14. In FIG. 9, the insulating layer 13 is formed of two insulating layer materials 13A, but these insulating layer materials 13A may be, for example, heated and integrated at the first charge.

The excess insulating layer 14 is, for example, stretched and cut by hand in a direction perpendicular to the stacking direction of each layer constituting the all-solid-state rechargeable battery 1 so that the positive electrode current-collecting portion 111 is exposed. At this time, if, for example, a cutout 13C is inserted between the insulating layer 13 and the excess insulating layer 14 in the thickness direction, the excess insulating layer 14 may be easily removed. This cutout 13C may be formed toward the outside in the stacking direction from the side of the positive electrode current-collecting portion 111, or may be formed toward the positive electrode current-collecting portion 111 side from the outside in the stacking direction. The cutout 13C may be formed over the entire width of the excess insulating layer 14, or may be formed in a broken line shape, and for example, it may be deeply pierced only in a range of a predetermined length from one end or both ends in the width direction of the excess insulating layer 14 so as to trigger cutting off. A depth of the cutout 13C in the thickness direction is desirably in the range of 5% or more and 99% or less of the thickness of the insulating layer 13 in the stacking direction of the all-solid-state rechargeable battery 1.

Cutting to a depth of 5% or more of the thickness of the insulating layer is desirable because it is easy to cut off the excess insulating layer 14. The cutout 13C having a depth of 99% or less of the thickness of the insulating layer 13 is desirable because cracking or cutting of the positive electrode current-collecting portion 111 may be suppressed while isostatic pressure is absent. On the other hand, the method of removing the excess insulating layer 14 is not limited to the above, and may be removed by a tool or machine, not by human hands.

Figure 10:
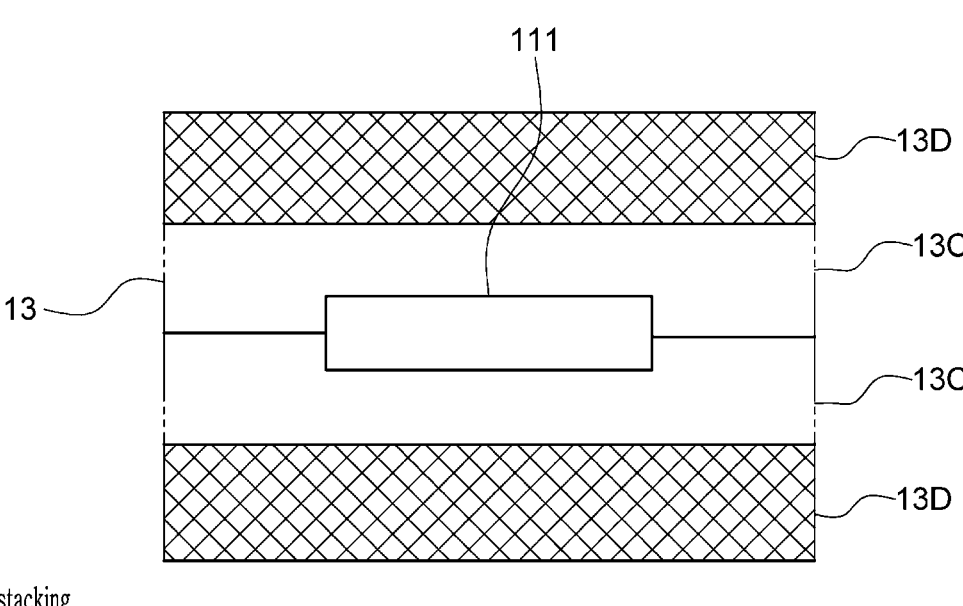
FIG. 10 is an enlarged view illustrating a roughened portion of an all-solid-state rechargeable battery according to an embodiment.
Figure 10:
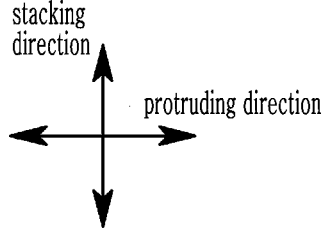

3. Characteristics of all-Solid-State Rechargeable Battery Manufactured According to the Manufacturing Method in the Present Embodiment As shown in FIG. 10, in the all-solid-state rechargeable battery 1 in which the excess insulating layer 14 formed integrally with the insulating layer 13 is removed by stretching and cutting the insulating layer 13 by hand, a roughened portion 13D having a different surface roughness than that of the other side end surface of the insulating layer 13 is formed on the side end surface of the insulating layer 13 on the side from which the positive electrode current-collecting portion 111 protrudes.

This roughened portion 13D refers to an irregular cross section formed when, for example, the excess insulating layer 14 is removed by stretching the insulating layer 13 by hand, and the roughened portion 13D has a rougher surface compared to the other side end surfaces of the insulating layer 13. In the present embodiment, since the excess insulating layer 14 is stretched and cut, the roughened portion 13D is in a state where the resin is torn and broken at the boundary between the excess insulating layer 14 and the insulating layer 13.

When the cutout 13C is formed between the insulating layer 13 and the excess insulating layer 14 as in the present embodiment, as shown in FIG. 13D, this roughened portion 13D is formed in a portion excluding the portion where the cutout 13C is formed. On the other hand, FIG. 10 is a schematic view of the all-solid-state rechargeable battery 1 (shown in FIG. 9 (*b*)) after the excess insulating layer 14 is removed, as viewed from the side where the positive electrode current-collecting portion 111 protrudes, and shows the insulating layer 13 and the positive electrode current-collecting portion 111 of the all-solid-state rechargeable battery in the case where a cutout 13C is formed from the positive electrode current-collecting portion 111 to about half the thickness of the insulating layer 13 toward the outside.

As described above, the other surface portion 13D such as the roughened portion 13D differs in the location where the cutout 13C is formed, and for example, it may be formed entirely, or formed only in a portion between the insulating layer 13 and the excess insulating layer 14. A thickness of the roughened portion 13D in the stacking direction is desirably 1% or more and 95% or less of the thickness of the insulating layer in the range excluding the cutout.

4. Effects of the all-Solid-State Rechargeable Battery and the Manufacturing Method of the all-Solid-State Rechargeable Battery According to the Present Embodiment Since all-solid-state rechargeable battery 1 has solidified powder to form each layer, if it is manufactured without pressure treatment by isostatic pressure or the like, grooves or protrusions and recesses may be formed on the surface of each layer due to a slight gap between the powders and the like. According to the manufacturing method of the all-solid-state rechargeable battery 1 according to the present embodiment, since the whole is formed by isostatic pressure press, protrusions and recesses on the surface of the all-solid-state rechargeable battery 1 may be suppressed. As a result, in the stacked all-solid-state rechargeable battery in which a plurality of these all-solid-state rechargeable batteries 1 are stacked, it is possible to avoid concentration of current only on the protruding portion of the all-solid-state rechargeable battery 1. If it is possible to avoid concentration of current on only a portion of the surface of the all-solid-state rechargeable battery 1 in this way, since the entirety of the positive electrode layer 10 and the negative electrode layer 20 contribute to charge and discharge, the charge and discharge capacity of the stacked all-solid-state rechargeable battery may be improved. In addition, since the positive electrode layer 10 and the negative electrode layer 20 uniformly contribute to charge and discharge over the entirety, it is possible to suppress concentrated precipitation of metallic lithium or the like in only a portion of the region. As a result, short-circuit due to precipitation of metallic lithium may be suppressed.

In addition, since the whole surface of the positive electrode current-collecting portion 111 is covered from both surfaces by the current-collecting portion protection member 14 during isostatic pressing, cracking of the positive electrode current-collecting portion 111 and breakage of the positive electrode current-collecting portion 111 may be suppressed. As a result, there is no need to connect the positive electrode current-collecting portion 111 to the positive electrode current collector 11 again, and the highly reliable all-solid-state rechargeable battery 1 and stacked all-solid-state rechargeable battery may be manufactured.

5. Method for Manufacturing Stacked Solid-State Rechargeable Battery

A plurality of all-solid-state rechargeable batteries 1 manufactured as described above are stacked to obtain a stacked all-solid-state rechargeable battery. During the stacking, the negative electrode current collector 21 and the negative electrode current collector 21 of the other all-solid-state rechargeable battery 1 are disposed to face each other with the insulating layer 13 interposed therebetween. Accordingly, even if a relatively large number of all-solid-state rechargeable batteries 1 are stacked, for example three or four or more, it is possible to manufacture a stacked all-solid-state rechargeable battery that sufficiently maintains cycle characteristics and is unlikely to cause a short circuit.

6. Charging and Discharging of the all-Solid-State Rechargeable Battery According to the Present Embodiment Charging and discharging of the all-solid-state rechargeable battery 1 according to the present embodiment will be described.

In the all-solid-state rechargeable battery 1 according to the present embodiment, the negative electrode active material that forms an alloy or compound with lithium in the negative electrode active material layer 22 forms an alloy or compound with lithium ions in the initial stage of charging, so that lithium is intercalated in the negative electrode active material layer 22. After that, after exceeding the charging capacity exhibited by the negative electrode active material layer 22, metallic lithium precipitates on one or both surfaces of the negative electrode active material layer 22 to form a metallic lithium layer.

Since metallic lithium is formed while diffusing through a negative electrode active material capable of forming an alloy or compound, it is not a branched type (dendrite type), but is formed uniformly between the negative electrode active material layer 22 and the negative electrode current collector 21. During discharge, metallic lithium is ionized in the negative electrode active material layer 22 and the metallic lithium layer, and moves toward the positive electrode active material layer 12 side. Therefore, since metallic lithium itself may be used as a negative electrode active material as a result, the energy density is improved.

In addition, when the metallic lithium layer is formed between the negative electrode active material layer 22 and the negative electrode current collector 21, that is, inside the negative electrode layer 20, the negative electrode active material layer 22 covers the metallic lithium layer. Accordingly, the negative electrode active material layer 22 functions as a protective layer for the metal layer. Accordingly, short-circuiting and capacity reduction of the all-solid-state rechargeable battery 1 may be suppressed, and furthermore, the characteristics of the all-solid-state rechargeable battery 1 may be improved.

In the negative electrode active material layer 22, a method of enabling metallic lithium to be precipitated may be, for example, a method of increasing the charge capacity of the positive electrode active material layer 12 than the charge capacity of the negative electrode active material layer 22. Specifically, the comparison (capacity ratio) between the charge capacity of the positive electrode active material layer 12 and the charge capacity of the negative electrode active material layer 22 satisfies the requirements of Equation (1).

$$0.002 < b/a < 0.5 \qquad (1)$$

a: charge capacity (mAh) of the positive electrode active material layer 12
    b: charge capacity (mAh) of the negative electrode active material layer 22

When the capacity ratio represented by Equation 1 is larger than 0.002, the negative electrode active material layer 22 may sufficiently mediate precipitation of metallic lithium from lithium ions, regardless of a composition of the negative electrode active material layer 22, so that a metallic lithium layer is easy to appropriately form. In addition, even when the metallic lithium layer is formed between the negative electrode active material layer 22 and the negative electrode current collector 21, the negative electrode active material layer 22 still may sufficiently function as a protective layer, which is desirable. Accordingly, the capacity ratio is desirably greater than or equal to 0.01 and more desirably greater than or equal to 0.03.

In addition, when the capacity ratio is less than 0.5, the negative electrode active material layer 22 may not store most of lithium during the charge, regardless of the composition of the negative electrode active material layer 22, wherein the metallic lithium layer is easy to uniformly form. The capacity ratio may be more desirably less than or equal to 0.2 or much more desirably less than or equal to 0.1.

The capacity ratio is larger than 0.01, which is more desirable. When the capacity ratio is less than or equal to 0.01, characteristics of the all-solid-state rechargeable battery 1 may be deteriorated. The reason is that the negative electrode active material layer 22 may not sufficiently function as a protective layer. For example, when the negative electrode active material layer 22 is extremely thin, the capacity ratio may be less than or equal to 0.01. Herein, the negative electrode active material layer 22 may collapse by repeated charges and discharges, precipitating and growing dendrites. As a result, the characteristics of the all-solid-state rechargeable battery 1 may be deteriorated. In addition, the capacity ratio may be desirably smaller than 0.5. When the capacity ratio is greater than or equal to 0.5, a precipitation amount of lithium in the negative electrode layer 20 may be reduced, possibly deteriorating battery capacity. For the same reason, the capacity ratio may be more desirably less than 0.25. In addition, the capacity of less than 0.25 may more improve output characteristics of the battery.

Herein, charge capacity of the positive electrode active material layer 12 is obtained by multiplying charge specific capacity (mAh/g) of a positive electrode active material in the positive electrode active material layer 12 and a mass of the positive electrode active material. When a plurality of types of the positive electrode active materials are used, the charge capacity of the positive electrode active material layer 12 may be obtained by calculating charge specific capacity×mass of each positive electrode active material and then, adding them up into a total sum. In addition, charge capacity of the negative electrode active material layer 22 may be obtained the same method. In other words, the charge capacity of the negative electrode active material layer 22 is obtained by multiplying charge specific capacity (mAh/g) of a negative electrode active material in the negative electrode active material layer 22 and a mass of the negative electrode active material. When a plurality of types of the negative electrode active materials are used, the charge capacity of the negative electrode active material layer 22 may be obtained by calculating charge specific capacity×mass of each negative electrode active material and then, adding them up into a total sum. Herein, the charge specific capacities of the positive and negative electrode active materials are capacities estimated by using an all-solid half-cell using a lithium metal as a counter electrode. In practice, the charge capacities of the positive electrode active material layer 12 and the negative electrode active material layer 22 are directly measured by using an all-solid half-cell.

A specific method for directly measuring the charge capacity may be the following method. First of all, the charge capacity of the positive electrode active material layer 12 is measured by using the positive electrode active material layer 12 as a working electrode and Li as a counter electrode to manufacture an all-solid half-cell and CC-CV charging the cell from an open charge voltage (OCV) to an upper limit charge voltage. The upper limit charge voltage is determined according to a standard of JIS C 8712:2015, wherein an upper limit charge voltage of the positive electrode active material layer 12 using a lithium cobalt acid-based positive electrode active material is 4.25 V, and an upper limit charge voltage of the positive electrode active material layer 12 using other positive electrode active materials is a voltage required by applying the standard A. 3.2.3 of JIS C 8712:2015 (safety requirements when applied with different upper limit charge voltages). The charge capacity of the negative electrode active material layer 22 is measured by using the negative electrode active material layer 22 as a working electrode and Li as a counter electrode to manufacture an all-solid half-cell and CC-CV charging the cell from OCV (open charge voltage) to 0.01 V.

These measured charge capacities are respectively divided by a mass of each active material, obtaining charge specific capacity. The charge capacity of the positive electrode active material layer 12 may be initial charge capacity measured during the $1^{st}$ cycle charge.

In an example embodiment of the present invention, the charge capacity of the positive electrode active material layer 12 is set to exceed the charge capacity of the negative electrode active material layer 22. As will be described later, in the present embodiment, the all-solid-state rechargeable battery 1 is charged beyond the charge capacity of the negative electrode active material layer 22. In other words, the negative electrode active material layer 22 is over-charged. At the beginning of the charging, lithium is inter-calated into negative electrode active material layer 22. In other words, the negative electrode active material forms an alloy or a compound with lithium ions migrated from the positive electrode layer 10. When excessively charged beyond the capacity of the negative electrode active material layer 22, lithium is precipitated on the back of the negative electrode active material layer 22, that is, between the negative electrode current collector 21 and the negative electrode active material layer 22 and thus, forms a metallic lithium layer.

This phenomenon is caused by composing the negative electrode active material with a specific material, that is, a material forming an alloy or a compound with lithium. During the discharge, lithium in the negative electrode active material layer 22 and the metallic lithium layer is ionized and moves toward the positive electrode layer 10. Accordingly, in the all-solid-state rechargeable battery 1, metallic lithium may be used as a negative electrode active material. Specifically, when the charge capacity of the negative electrode layer 20 (total charge capacity exhibited by the negative electrode active material layer 22 and the metallic lithium layer) is 100%, 80% or more of the charge capacity is desirably exhibited by the metallic lithium layer.

In addition, the negative electrode active material layer 22, since the aforementioned metallic lithium layer is coated toward the solid electrolyte layer 30, may function as a protective layer of the metallic lithium layer and simulta-neously, suppress precipitation and growth of dendrites. Accordingly, the all-solid-state rechargeable battery 1 is more effectively suppressed from a short circuit and capacity deterioration and resultantly, exhibits improved characteris-tics of the all-solid-state rechargeable battery 1.

7. Another Embodiment of the Present Invention

The all-solid-state rechargeable battery according to the present invention is not limited to the above. For example, the first electrode layer may be a negative electrode layer and the second electrode layer may be a positive electrode layer.

In the embodiment, which illustrates that an insulating layer is disposed on the side end surface of the first electrode layer, the insulating layer also may be formed on the side end surface of the second electrode layer. The solid electro-lyte layer 30 disposed between the positive electrode layer and the negative electrode layer may be laminated as at least one layer, or two layers, three layers, four layers, or more layers.

In the embodiment, which illustrates specific examples of the roughened portion as the insulating layer wherein the roughened portion is formed after removing the excess insulating layer, the roughened portion may be smoother than the other surface of the insulating layer according to a method of removing the excess insulating layer or forming the insulating layer. The present invention is not limited to all-solid lithium ion rechargeable batteries but may be widely applied to all-solid-state rechargeable batteries hav-ing a thin current collecting portion and manufactured by a pressure treatment such as an isostatic press and the like.

DETAILED DESCRIPTION OF THE EMBODIMENTS

Example 1

Examples of the above-described embodiments will be described. In Example 1, the all-solid-state rechargeable battery cell 1 was manufactured the following process, and the manufactured all-solid-state rechargeable battery cell 1 was evaluated.

[Manufacture of Positive Electrode Layer]

$LiNi_{0.8}Co_{0.15}Al_{0.05}O_2$ (NCA) ternary powder as a posi-tive electrode active material, $Li_2S$—$P_2S_5$ (80:20 mol %) amorphous powder as a sulfide-based solid electrolyte, and vapor grown carbon fiber powder as a positive electrode layer conductive material (conductive auxiliary agent) were weighed in a mass ratio of 60:35:5 and mixed with a rotating revolution mixer. Subsequently, a dehydrated xylene solu-tion in which SBR as a binder was dissolved was added to this mixed powder to include 5.0 mass % of SBR based on a total mass of the mixed powder, preparing a primary mixed solution. In order to adjust viscosity of the primary mixed solution, an appropriate amount of dehydrated xylene was added thereto, preparing a secondary mixed solution.

In addition, in order to improve dispersibility of the mixed power, zirconia balls with a diameter of 5 mm were added to the secondary mixed solution, so that a space, the mixed powder, and the zirconia balls each took ⅓ of a total volume of a kneading vessel. Subsequently, a tertiary mixed solution obtained therefrom was put into a rotating revolution mixer and stirred at 3000 rpm for 3 minutes, preparing a positive electrode active material layer coating solution. Subse-quently, the positive electrode active material layer coating solution was coated on a sheet by preparing a 20 μm-thick aluminum foil as the positive electrode current collector 11, mounting the positive electrode current collector 11 on a desktop screen printer, and using a 150 μm-thick metal mask.

Subsequently, after drying the sheet coated with the positive electrode active material layer coating solution on a 60° C. hot plate for 30 minutes, the positive electrode active material layer coating solution was coated again on the other side of the sheet, dried on a 60° C. hot plate for 30 minutes, and then, vacuum-dried at 80° C. for 12 hours. A Thomson blade was used to cut this into a rectangular plate to form a positive electrode active material layer 12 on both sides of the positive electrode current collector 11. The positive electrode current collector 11 and the positive electrode active material layer 12 had a total thickness of about 330 μm after the drying.

An insulating resin film was cut out with a Pinnacle die to prepare an excess insulating layer material 13B in which the current-collecting portion protection member material 14A and the insulating layer material 13A were integrated. The insulating layer material 13A included in the excess insu-lating layer material 13B had a ring shape with so large a size as to accurately surround the positive electrode active material layer 12. The insulating resin film in the present example embodiment, which is made by Dainippon Printing Co., Ltd., contained a resin non-woven fabric as an insulat-ing filler. Between an excess portion (the current-collecting portion protection member material 14A) and a ring-shaped portion (the insulating layer material 13A), a cut was formed to about 70% of a thickness of the film in a thickness direction of the film to easily cut out the excess insulating layer 14 formed of the current-collecting portion protection member material 14A after the pressurization.

The positive electrode current collector 11 and the posi-tive electrode active material layer 12 were mounted on a 3 mm-thick aluminum plate (support material) to which a PET film release-treated on the surface (hereinafter, a releasing film) was attached, after disposing the insulating layer material 13A around the positive electrode active material layer 12, covered with the releasing film, and covered again with the 0.3 mm-thick excess insulating layer material 13B and an SUS metal plate with the same shape (support material), which were vacuum lamination-packed by including the support materials. After seated in a pressurization medium, a hydrostatic treatment was conducted at 490 MPa (by an isostatic press, press/compression chemical industry) to integrate the insulating layer material 13A with the positive electrode current collector 11 and the positive electrode active material layer 12.

The positive electrode active material layer 12 was stacked on both surfaces of the positive electrode current collector 11 to have the insulating layer material 13A cover the other peripheral sides differing from the stacking direction of the positive electrode active material layer 12, which is referred to as an "positive electrode layer 10A before cutting."

[Manufacture of Negative Electrode Layer]

A 10 μm-thick nickel foil current collector was prepared as the negative electrode current collector 21. In addition, as for a negative electrode active material, CB1 made by Asahi Carbon Co., Ltd. (nitrogen adsorption specific surface area of about 339 m²/g, DBP feed rate of about 193 ml/100 g), CB2 made by Asahi Carbon Co., Ltd. (nitrogen adsorption specific surface area of about 52 m²/g, DBP feed rate of about 193 ml/100 g), and silver particles with a particle diameter of 3 μm were prepared. On the other hand, the particle diameter of the silver particles may be, for example, a median diameter (so-called D50) measured by using a laser-type particle size distribution analyzer. Subsequently, 1.5 g of CB1, 1.5 g of CB2, and 1 g of the silver particles were put in a vessel, and 4 g of an N-methyl pyrrolidone (NMP) solution including 5 mass % of a binder (#9300, Kureha Co., Ltd.) was added thereto. Then, this mixed solution was continuously mixed, while a total amount of 30 g of NMP was little by little added thereto, preparing a negative electrode active material layer coating solution.

This negative electrode active material layer coating solution was coated on an Ni foil by using a blade coater and then, dried at 80° C. for about 20 minutes, forming the negative electrode active material layer 22. The obtained stacked body was vacuum-dried at 100° C. for about 12 hours and then, cut out with a Pinnacle die. Through the above process, the negative electrode layer 20 was manufactured.

[Preparation of Solid Electrolyte Layer Coating Liquid]

An SBR binder dissolved in dehydrated xylene was added to $Li_2S$—$P_2S_5$ (80:20 mol %) amorphous powder as a sulfide-based solid electrolyte to have 1 mass % of the SBR binder based on a total amount of the solid electrolyte, preparing primary mixed slurry. In addition, to this primary mixed slurry, dehydrated xylene and dehydrated diethylbenzene in each appropriate amount were added for adjusting viscosity, preparing secondary mixed slurry. Furthermore, in order to improve dispersibility of the mixed powder, zirconia balls with a diameter of 5 mm were added to the secondary mixed slurry, so that a space, the mixed powder, and the zirconia balls respectively took ⅓ of a total volume of a kneading vessel. The obtained tertiary mixed slurry was put in a rotating revolution mixer and then, stirred at 3000 rpm for 3 minutes, preparing a solid electrolyte layer coating solution.

[Manufacture of Solid Electrolyte Sheet]

The prepared solid electrolyte layer coating solution was coated on a PET film release-treated on the surface with a blade and then, dried on a hot plate at 40° C., dried for 10 minutes, and vacuum-dried at 40° C. for 12 hours, obtaining a solid electrolyte sheet. After the drying, a solid electrolyte layer in the solid electrolyte sheet had a thickness of about 42 μm. The dried solid electrolyte sheet was cut out with a Thomson blade and processed into a predetermined size.

[Manufacture of Electrolyte-Negative Electrode Structure]

The solid electrolyte sheet was disposed on the surface of the negative electrode layer 20 to make the solid electrolyte layer 30 in contact with the negative electrode active material layer 22 and then, stacked on the surface of a 3 mm-thick aluminum plate (support material) to which a release film was attached, which was vacuum lamination-packed by including the support materials. After seated in a pressurization medium, a hydrostatic pressure treatment at 10 MPa (by an isostatic press press/compression chemical industry) was performed to integrate the solid electrolyte layer on the solid electrolyte sheet with the negative electrode layer 20. This was referred to as an electrolyte-negative electrode structure 20A.

[Manufacture of all-Solid-State Rechargeable Battery Cell]

Before the cutting, the electrolyte negative electrode structure 20A was disposed to be inserted between two positive electrode layers 10A. Herein, the outer edge 2E at a side where the positive electrode current-collecting portion 111 of the electrolyte negative electrode structure 20A was protruded was disposed between the cutout 13C and the side end surface S of the positive electrode layer 10. This stacked body was placed on a 3 mm-thick aluminum plate (support material), covered with a releasing film, and covered again with a 0.3 mm-thick SUS metal plate (support material) with the same shape as the electrolyte negative electrode structure 20A and then, vacuum lamination-packed by including the support materials. After seated in a pressurization medium, a hydrostatic pressure treatment at 490 MPa (by an isostatic press, press/compression chemical industry) was performed. Subsequently, the obtained untreated all-solid-state rechargeable battery cell 1A was taken out from the laminate pack, and the excess insulating layer 14 was cut out from the cutout 13C formed between the insulating layer 13 and the excess insulating layer 14, manufacturing the all-solid-state rechargeable battery cell 1 (single battery cell).

On the other hand, the examples used the aluminum plate and the SUS metal plate as support materials but may include any material having sufficient strength to the pressurization treatment by an isostatic pressure without particular limitation.

[Manufacture of Stacked all-Solid-State Rechargeable Battery Cell]

A stacked all-solid-state rechargeable battery cell was obtained by stacking the manufactured all-solid-state rechargeable battery cell 1 as a single cell into 4 layers, welding Al metal tabs and Ni metal tabs respectively to each positive electrode current-collecting portion 111 and each negative electrode current-collecting portion 211 and then, lamination-packing them.

[Evaluation of all-Solid-State Rechargeable Battery Cell]

The stacked all-solid-state rechargeable battery cell manufactured in the above procedure was placed between two metal plates from the outside of the stacking direction and then, tightened by passing a screw with a disc spring through a hole previously drilled in the metal plates, so that 1.0 MPa of a pressure was applied thereto. The stacked all-solid-state rechargeable battery cell in the pressurized state was evaluated with respect to characteristics, as described above, by charging at a constant current of 0.1 C to an upper limit voltage of 4.25 V and also, charging to a current of 0.05 C at a constant voltage and then, discharging to a cut-off voltage of 2.5 V at 0.1 C at 45° C. and using a charge/discharge evaluation apparatus, TOSCAT-3100. The evaluation results are shown in FIG. 11.

Figure 12:
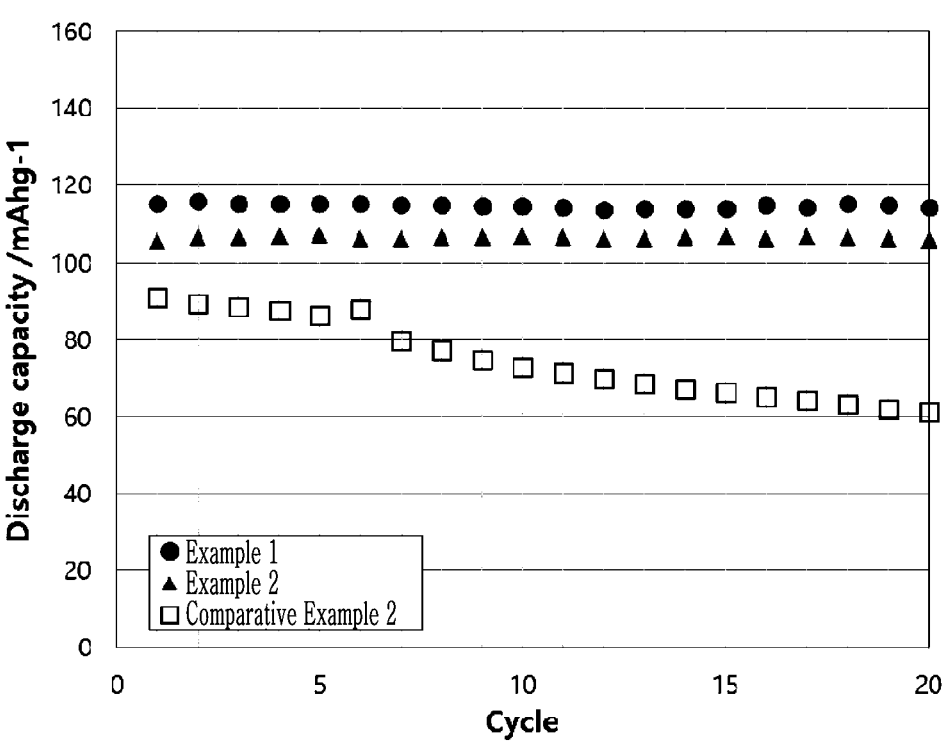
FIG. 12 is a graph showing cycle characteristics of all-solid-state rechargeable battery cells according to examples and comparative example.

In addition, the stacked all-solid-state rechargeable battery cell in the pressurized state, as described above, was evaluated with respect to a charge/discharge cycle by charging to an upper limit voltage of 4.25 V at a constant current of 0.33 C and discharging to a cut-off voltage of 2.5 V at 0.33 C at 45° C. The results are shown in FIG. 12.

In addition, this stacked all-solid-state rechargeable battery cell was measured with respect to a total thickness including a laminate film by using a film thickness meter. The stacked all-solid-state rechargeable battery cell was evaluated with respect to protrusions and recesses of the surface by examining behaviors at 6 different points and a thickness deviation. The results are shown in Table 1.

Figure 11:
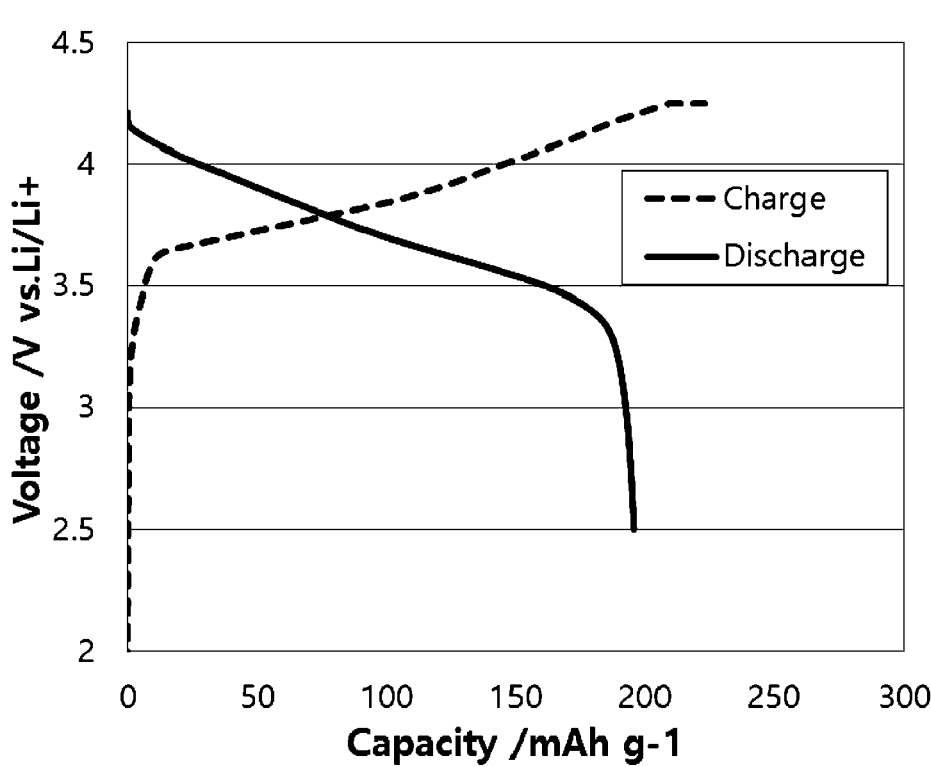
FIG. 11 is a graph showing results of charge/discharge evaluation of the all-solid-state rechargeable battery cell according to one example.

In a graph of FIG. 11, in which neither overcharging beyond theoretical capacity nor a spike-type charge and discharge curved line was not observed, there were no charge and discharge problem, no short circuit phenomenon, and neither crack nor cut on the positive electrode current-collecting portion 111. In addition, referring to the graph of FIG. 11, the stacked all-solid-state rechargeable battery cell of Example 1 turned out to be charged and discharged without a short-circuit. Furthermore, referring to the result of FIG. 12, the stacked all-solid-state rechargeable battery cell of Example 1 exerted stable charge and discharge cycle characteristics.

Example 2

An all-solid-state rechargeable battery cell 1 was manufactured in the same order as in Example 1 except that the solid electrolyte layer 30 was formed as two layers between the positive electrode layer 10 and the negative electrode layer 20, and then, the stacked all-solid-state rechargeable battery cells 1 were stacked to manufacture a stacked all-solid-state rechargeable battery cell and then, evaluated. A method of forming the solid electrolyte layer 30 as two layers is as follows.

[Manufacture of Electrolyte-Positive Electrode Structure]

Two solid electrolyte sheets in a state of being disposed between the positive electrode layers 10A before cutting were mounted on a 3 mm-thick aluminum plate (support material) to which a releasing film was attached, covered with another releasing film, covered again with a 0.3 mm-thick SUS metal plate (support material) with the same shape as the positive electrode layers 10A before cutting and then, vacuum lamination-packed by including the support materials After seated in a pressurization medium, a hydrostatic pressure treatment at 30 MPa (by an isostatic press, press/compression chemical industry) was performed to integrate the electrolyte layers on the electrolyte sheets with the positive electrode layers 10A before the cutting. This is referred to be as an electrolyte-positive electrode structure.

[Manufacture of all-Solid-State Rechargeable Battery Cell and Stacked all-Solid-State Rechargeable Battery Cell]

After disposing that the manufactured electrolyte-positive electrode structure between two electrolyte-negative electrode structures 20A, the all-solid-state rechargeable battery cell 1 and the stacked all-solid-state rechargeable battery were manufactured in the same manner as in Example 1.

[Evaluation of all-Solid-State Rechargeable Battery Cell]

Figure 13:
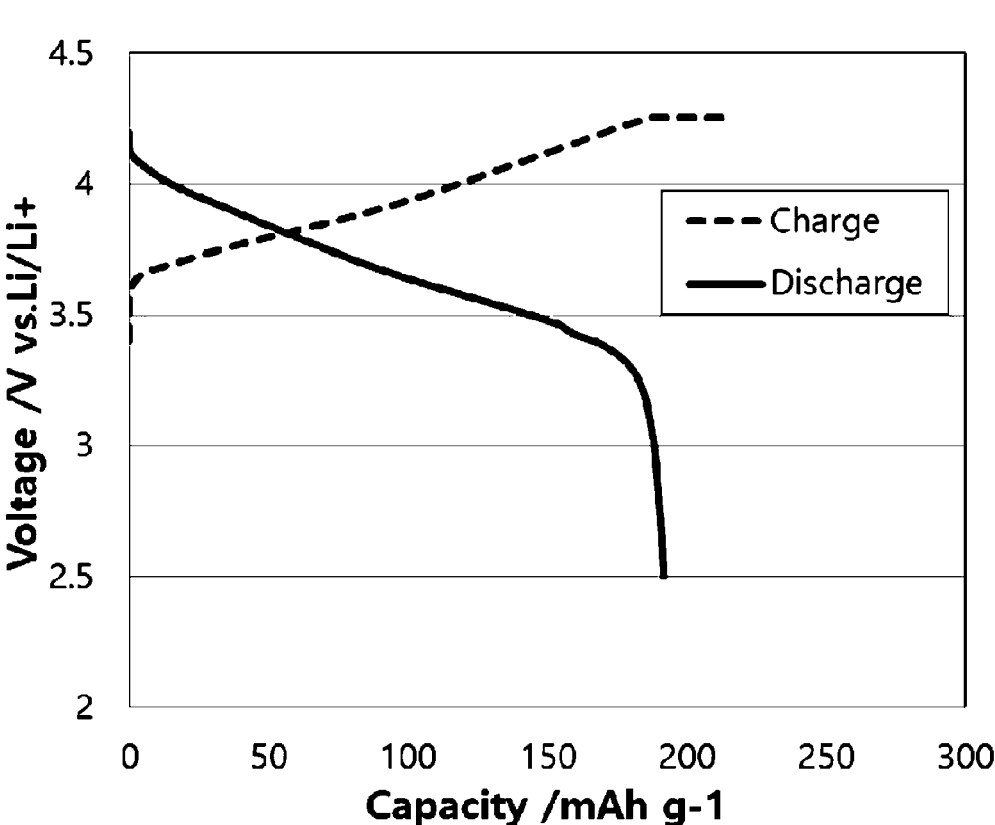
FIG. 13 is a graph showing results of charge/discharge evaluation of the all-solid-state rechargeable battery cell according to example.

The stacked all-solid-state rechargeable battery cell of Example 2 was evaluated with respect to charge/discharge characteristics and charge/discharge cycle characteristics in the same order as in Example 1, and the charge/discharge evaluation results are shown in FIG. 13, and the charge/discharge cycle evaluation results are shown in FIG. 12. Referring to the results of FIGS. 13 and 12, in a case of using the all-solid-state rechargeable battery cell 1 manufactured by stacking two of the solid electrolyte layers 30 between the positive electrode layer 10 and the negative electrode layer 20, the positive electrode current-collecting portion 111 exhibited neither crack nor cut like in Example 1, and in addition, the stacked all-solid-state rechargeable battery cell turned out to be stably charged and discharged without a short circuit.

Comparative Example 1

Figure 14:
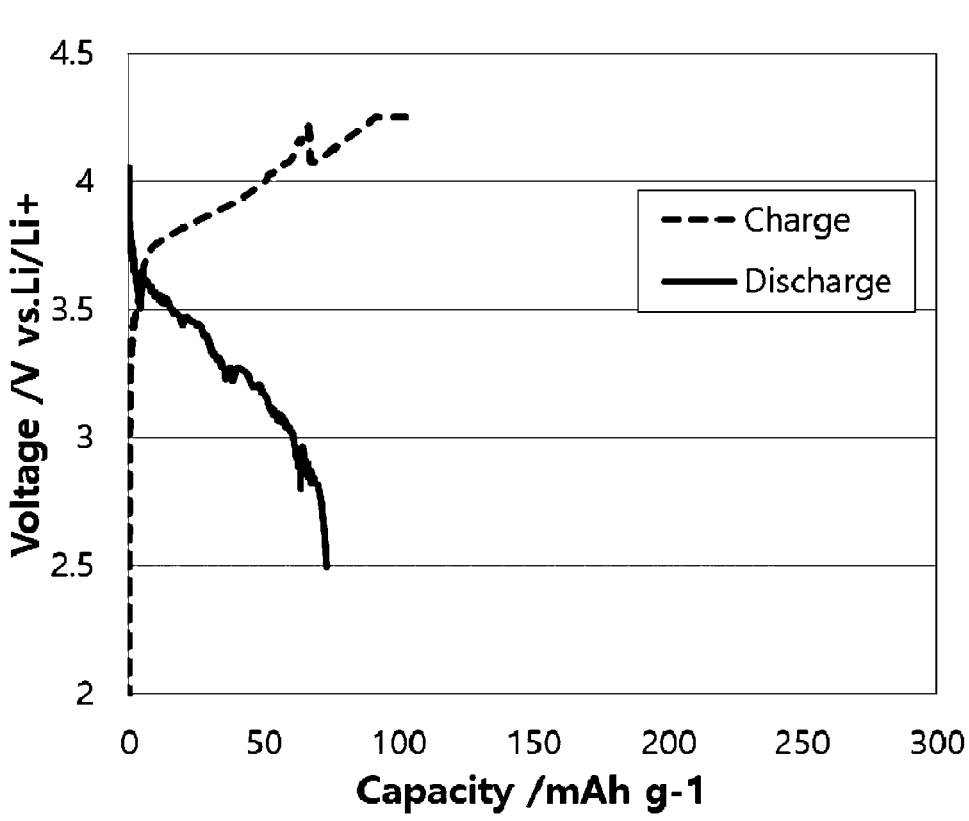
FIG. 14 is a graph showing results of charge/discharge evaluation of the all-solid-state rechargeable battery cell according to comparative example.

An all-solid-state rechargeable battery cell 1 and a stacked all-solid-state rechargeable battery cell were manufactured in the same order as in Example 1 except that the insulating layer material 13A not having the cutout 13C and the current-collecting portion protection member material 14A was used instead of the excess insulating layer material 13B and then, evaluated with respect to charge/discharge in the same order as in Example 1. The evaluation results are shown in FIG. 14. Referring to a graph of FIG. 14 showing a spike-type charge/discharge curve, since the positive electrode current-collector 111 had a crack and a cut, charge/discharge capacity far below the theoretical capacity was detected. In the graph of FIG. 14, when calculated from comparison of the charge/discharge capacity with the theoretical capacity, two or three all-solid-state rechargeable battery cells 1 out of four all-solid-state rechargeable battery cells 1 consisting of the stacked all-solid-state rechargeable battery cell were regarded to have a crack or a cut in the positive electrode current-collectors 111.

Comparative Example 2

A stacked all-solid-state rechargeable battery cell was manufactured in the same manner as in Example 1 except that the all-solid-state rechargeable battery cell 1 was manufactured by using the insulating layer material 13A not having the cut out 13C and the current-collecting portion protection member material 14A instead of the excess insulating layer material 13B and in the [manufacture of positive electrode layer] and the [manufacture of all-solid-state rechargeable battery cell], using the aluminum plate used in Example 1 alone but not using the 0.3 mm-thick SUS metal plate as a support material and then, evaluated.

Figure 15:
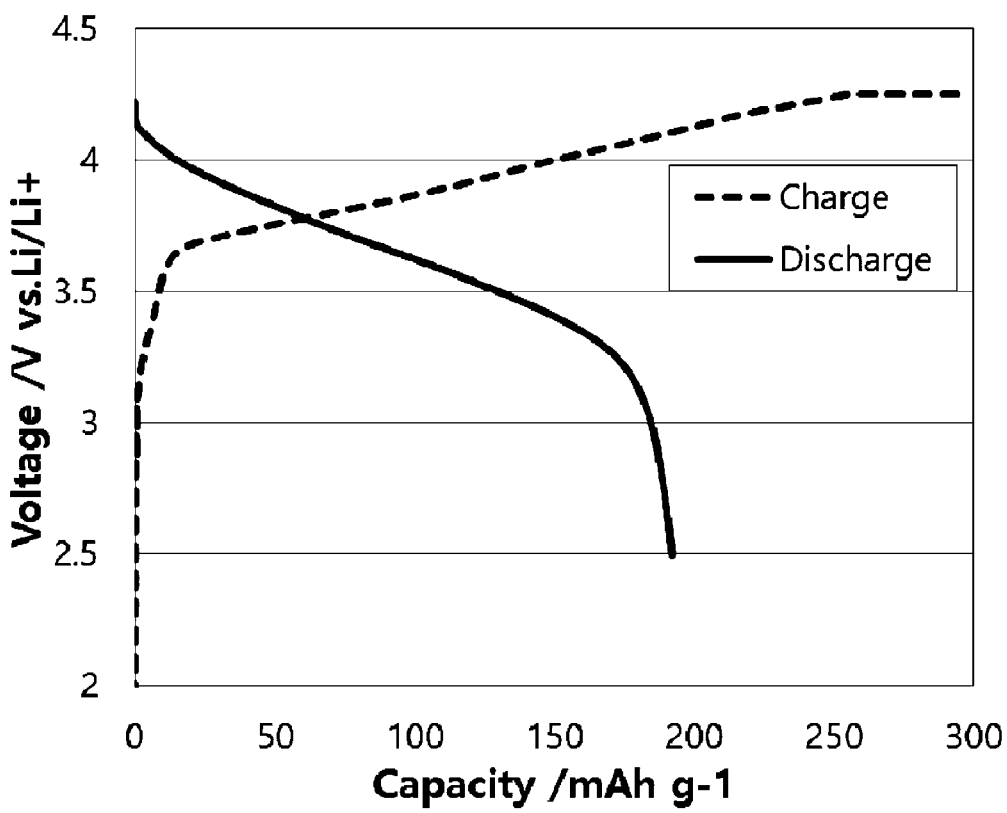
FIG. 15 is a graph showing results of charge/discharge evaluation of the all-solid-state rechargeable battery cell according to comparative example.

This stacked all-solid-state rechargeable battery cell was measured with respect to a total film thickness including a laminate film in the same manner as in Example 1 by using a film thickness meter. In addition, protrusions and recesses of the surface were evaluated by examining behaviors at 6 different points and a thickness deviation. The results are shown in Table 1. FIG. 15 shows the results of charge/discharge evaluation, and FIG. 12 shows the results of charge and discharge cycle evaluation.

Referring to the results of FIG. 15, the stacked all-solid-state rechargeable battery cell of Comparative Example 2 exhibited excessive charge capacity beyond the theoretical capacity, from which the positive electrode current-collecting portion 111 was judged to have neither crack nor cut, but a short circuit occurred. In addition, the result of FIG. 12, the charge/discharge capacity was significantly deteriorated due to the short circuit.

Example 3

The all-solid-state rechargeable battery cell 1 of Example 1 was not stacked but used as a single cell and lamination-

Figure 16:
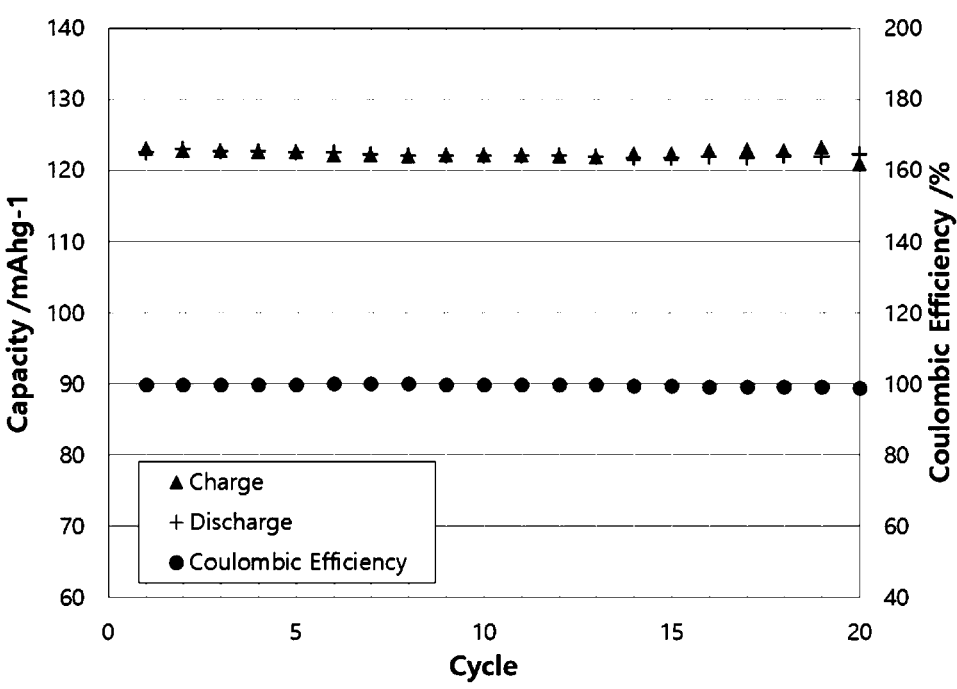
FIG. 16 is a graph showing cycle characteristics of an all-solid-state rechargeable battery cell according to example.

27 packed by respectively by welding an Al metal tab and a Ni metal tab to the positive electrode current collector 11 and the negative electrode current collector 21, and then, a battery test was conducted. The cell was evaluated with respect to charge/discharge cycle characteristics in the same manner as in Example 1, and the results are shown in FIG. 16. The results show that satisfactory cycle characteristics were equally observed like the stacked all-solid-state rechargeable battery cell of Example 1. The all-solid-state rechargeable battery cell 1 of Example 3 was measured with respect to a total film thickness including a laminate film in the same manner as in Example 1 at 6 points by using a film thickness meter and also, evaluated with respect to a thickness deviation. The results are shown in Table 1.

Comparative Example 3

The all-solid-state rechargeable battery cell 1 of Comparative Example 2 was not stacked but used as a single cell and then, lamination-packed and measured with respect to a total thickness including a laminate film by using a film thickness meter at 6 points and also evaluated with respect to a thickness deviation. The measurement was performed in the same method as in Example 1. The results are shown in Table 1.

TABLE 1

| | Number of single cells | Gasket | Thickness/ μm | Average thickness/ μm | Standard deviation |
|---|---|---|---|---|---|
| Example 1 | 4 | current-collecting portion protection member is present | 1860 1868 1852 1856 1865 1851 | 1859 | 6.3 |
| Example 3 | 1 | current-collecting portion protection member is present | 627 620 621 635 619 615 | 623 | 6.5 |
| Comparative Example 2 | 4 | current-collecting portion protection member is absent | 1793 1810 1799 1812 1817 1809 | 1807 | 8.1 |
| Comparative Example 3 | 1 | current-collecting portion protection member is absent | 670 652 652 627 625 619 | 641 | 18.3 |

Referring to the results of Table 1, comparing Example 1 with Comparative Example 2 and Example 3 with Comparative Example 3 with respect to a thickness deviation, Examples 1 and 3 using a 0.3 mm SUS metal plate during the isostatic pressure exhibited clearly a smaller thickness deviation than Comparative Examples 1 and 3 using no SUS metal plate during the isostatic pressure (performing a pressurization treatment by disposing a support material on one surface of the positive electrode layer 10 or the all-solid-state rechargeable battery cell 1) and in addition, suppressed protrusions and recesses of the surface. When the protrusions and recesses of the surface were suppressed, there was no current concentration on the protrusions. When a current was not applied to one portion by concentration, the entire positive and negative electrode layers 10 and 20 contributed to charging and discharging, resultantly improving charge and discharge capacity of the all-solid-state rechargeable battery cell 1. In addition, the positive electrode layer 10 and the negative electrode layer 20 uniformly contributed to charging and discharging throughout and thus may, for example, suppress a short circuit due to precipitation of metallic lithium and the like according to the current concentration on some portions where the metallic lithium and the like were present. As a result, as shown in FIG. 12, Examples 1 and 2 exhibited no short circuit but thus realized stable charge and discharge cycles.

As seen from the above results, in order to more flatten the surface of the all-solid-state rechargeable battery cell 1 as in Example 1 or 3, the positive electrode layer 10, the negative electrode layer 20, or a stacked body for forming all-solid-state rechargeable battery cell 1 are desirable to pressurize in a state of being sandwiched by two sheets of support materials on both sides in a stacking direction.

However, when the pressure treatment such as an isostatic pressure was performed on both sides sandwiched by the support materials, as seen from comparison with Comparative Examples 1 and 2, a current-collecting portion could be highly possibly cracked or cut. Accordingly, when the all-solid-state rechargeable battery cell 1 was pressure-treated with the support materials disposed at both sides thereof, the effect of having the excess insulating layer 14 was more significantly exhibited.

In this way, when the pressure treatment such as an isostatic pressure and the like in a state of sandwiched by the support materials at both sides, a shape seen from a stacking direction of the support material at one side should be matched with a shape seen from a stacking direction of the positive electrode layer 10, the negative electrode layer 20, or the all-solid-state rechargeable battery cell 1 for the pressure treatment For example, when a support material having a larger shape than that of the all-solid-state rechargeable battery cell 1 was used for the pressure treatment by isostatic pressure at both sides thereof, since a portion of the support not contacting with the positive electrode layer 10, the negative electrode layer 20, or the all-solid-state rechargeable battery cell 1 was greatly bent in the stacking direction, the support was impossible to reuse. In addition, since a space between the support materials was created by a thickness of the all-solid-state rechargeable battery cell 1 inserted between the supports, the vacuum lamination-packed laminate material may be broken when subjected to the pressurization treatment by isostatic pressure.

Referring to Examples 1 and 2 examining the stacked all-solid-state rechargeable battery in which four all-solid-state rechargeable battery cells 1 were stacked, a stacked all-solid-state rechargeable battery in which five or more all-solid-state rechargeable battery cells 1 according to the present invention were stacked was sufficiently inferred to similarly have neither crack nor cut on the positive electrode current-collecting portions 111. On the other hand, it goes without saying that the present invention is not limited to these examples.

DESCRIPTION OF SYMBOLS

1 all-solid-state rechargeable battery
10 positive electrode layer
11 positive electrode current collector
12 positive electrode active material layer
13 insulating layer 14 current-collecting portion protection member (excess insulating layer)
20 negative electrode layer
21 negative electrode current collector
22 negative electrode active material layer
30 solid electrolyte layer

The invention claimed is:

1. An all-solid-state rechargeable battery, comprising:
a first electrode layer, the first electrode layer being a positive electrode layer or a negative electrode layer;
solid electrolyte layers stacked on both surfaces of the first electrode layer;
a second electrode layer stacked on outer surfaces of the solid electrolyte layers, respectively, the second electrode layer being the other of the positive electrode layer or the negative electrode layer;
an insulating layer on a side end surface of the first electrode layer and covering the first electrode layer; and
a thin current-collecting portion protruding from the first electrode layer through the insulating layer to the outside,
wherein a side end surface of the insulating layer on the side from which the current-collecting portion protrudes has a roughened portion having a surface roughness that differs from that of another side end surface of the insulating layer.

2. The all-solid-state rechargeable battery of claim 1, wherein the roughened portion is a roughened portion relative to a roughness of the other side end surface of the insulating layer.

3. The all-solid-state rechargeable battery of claim 2, wherein the roughened portion is formed when an excess insulating layer formed on the outside of the side end surface of the insulating layer is removed.

4. The all-solid-state rechargeable battery of claim 3, wherein the excess insulating layer surrounds and protects the protruding portion of the current-collecting portion before removing the excess insulating layer.

5. The all-solid-state rechargeable battery of claim 1, wherein a thickness of the roughened portion in a stacking direction is 1% or more and 95% or less of a thickness of the insulating layer in a stacking direction.

6. The all-solid-state rechargeable battery of claim 3, wherein the excess insulating layer is integrated with the insulating layer.

7. The all-solid-state rechargeable battery of claim 1, wherein the insulating layer includes a resin.

8. The all-solid-state rechargeable battery of claim 7, wherein the insulating layer includes an insulating filler.

9. The all-solid-state rechargeable battery of claim 8, wherein the insulating filler includes a fibrous resin, a resin nonwoven fabric, alumina, magnesium oxide, silica, boehmite, barium titanate, barium carbonate, yttrium oxide, or manganese oxide.

10. The all-solid-state rechargeable battery of claim 1, wherein at least a portion of an outer edge of the insulating layer on the side from which the current collector protrudes is outside of an outer edge of the second electrode layer.

11. The all-solid-state rechargeable battery of claim 10, wherein at least a portion of the outer edge of the second electrode layer is on the insulating layer.

12. The all-solid-state rechargeable battery of claim 1, wherein the first electrode layer is a positive electrode layer.

13. The all-solid-state rechargeable battery of claim 1, wherein the solid electrolyte layer includes a sulfide solid electrolyte including lithium, phosphorus, and sulfur.

14. The all-solid-state rechargeable battery of claim 1, wherein:
the negative electrode layer includes a negative electrode active material that forms an alloy with lithium or a negative electrode active material that forms a compound with lithium,
metallic lithium is capable of being precipitated inside the negative electrode layer during charging, and
more than 80% of the charge capacity of the negative electrode layer is exhibited by the metallic lithium.

15. The all-solid-state rechargeable battery of claim 1, wherein the negative electrode layer includes amorphous carbon, gold, platinum, palladium, silicon silver, aluminum, bismuth, tin, or zinc.

16. A stacked all-solid-state rechargeable battery, comprising two or more stacked all-solid-state rechargeable batteries according to claim 1.

17. A method of manufacturing an all-solid-state rechargeable battery, the method comprising:
manufacturing a stacked body in which solid electrolyte layers are stacked on both surfaces of a first electrode layer that is either a positive electrode layer or a negative electrode layer, a second electrode layer that is the other of the positive electrode layer or the negative electrode layer is stacked on the outer surface of each solid electrolyte layer, a thin current-collecting portion that electrically connects the first electrode layer to an external wire is disposed to protrude outward from the first electrode layer, and a current-collecting portion protection member that protects the current-collecting portion is arranged to wrap the current-collecting portion; the stacked body further includes an insulating layer covering a side end surface of the first electrode layer,
pressurizing the stacked body in the stacking direction; and
removing the current-collecting portion protection member after the pressurizing, resulting in a side end surface of the insulating layer on the side from which the current-collecting portion protrudes having a roughened portion with a surface roughness that differs from that of another side end surface of the insulating layer.

18. The method of manufacturing the all-solid-state rechargeable battery of claim 17, wherein:
the current-collecting portion protection member is an excess insulating layer integrally formed on the side end surface of the insulating layer.

19. The method of manufacturing the all-solid-state rechargeable battery of claim 18, wherein a cutout for removing the excess insulating layer is formed between the insulating layer and the excess insulating layer.

20. The method of manufacturing the all-solid-state rechargeable battery of claim 19, wherein the cutout is formed in a range of 5% or more and 99% or less of a thickness of the excess insulating layer.

* * * * *